(12) United States Patent
Banning et al.

(10) Patent No.: US 8,579,428 B2
(45) Date of Patent: Nov. 12, 2013

(54) COLORANTS

(75) Inventors: Jeffery H. Banning, Hillsboro, OR (US); Kelley A. Moore, Salem, OR (US); Randall R. Bridgeman, Tualatin, OR (US); Scott M. Broce, Newberg, OR (US); Stephan V. Drappel, Toronto (CA); Michael B. Meinhardt, Lake Oswego, OR (US); Jule W. Thomas, Jr., West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 72 days.

(21) Appl. No.: 13/352,840

(22) Filed: Jan. 18, 2012

(65) Prior Publication Data

US 2013/0184388 A1   Jul. 18, 2013

(51) Int. Cl.
  *C09D 11/10*   (2006.01)
  *C08L 33/02*   (2006.01)

(52) U.S. Cl.
  USPC ............ 347/99; 524/210; 524/450; 524/556; 525/327.5; 525/327.6; 525/329.5; 525/450

(58) Field of Classification Search
  USPC ................... 525/327.5, 327.6, 329.5, 450
  See application file for complete search history.

(56) References Cited

U.S. PATENT DOCUMENTS

| | | | |
|---|---|---|---|
| 3,637,581 A * | 1/1972 | Horiguchi et al. | 526/91 |
| 5,362,812 A * | 11/1994 | Holmes et al. | 525/274 |
| 7,005,473 B2 * | 2/2006 | Ramesh et al. | 524/602 |
| 7,119,178 B2 * | 10/2006 | Madaras et al. | 534/698 |

* cited by examiner

*Primary Examiner* — Vu A Nguyen
(74) *Attorney, Agent, or Firm* — Judith L. Byorick

(57) ABSTRACT

Disclosed are colorants comprising a colored laked complex of (a) a chromogen molecule having at least one (i) carboxylic acid group, (ii) carboxylate group, (iii) sulfonic acid group, (iv) sulfonate group, or (v) combination thereof, and (b) a polymer, said chromogen molecule and said polymer each being complexed to (c) a metal. Also disclosed are phase change inks containing the colorants.

20 Claims, No Drawings

COLORANTS

BACKGROUND

Disclosed herein are colorants suitable for use in hydrophobic media. More specifically, disclosed herein are colorants suitable for use in applications such as phase change inks.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks are desirable for ink jet printers because they remain in a solid phase at room temperature during shipping, long term storage, or the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, or the like), the droplets solidify immediately upon contact with the substrate, so that migration of ink along the printing medium is prevented and dot quality is improved.

Colorants such as Pigment Red 57:1, Pigment Red 57:2, Pigment Red 57:3, and analogous laked BON-acid-type dyes (beta oxynaphthoic acid, also known as 3-hydroxy-2-naphthoic acid), as well as other —COOH and —SO₃H containing dyes and their salts, are inexpensive and commercially available pigments and dyes. However, they typically are laked or metal-complexed to themselves intermolecularly as well as complexed with a small percent of abietic acid moieties (See, e.g., "British Intelligence Objectives Subcommittee Report 1661," Publication Board No. 86139, Library of Congress, Washington, D.C., 1947, pp. 108-117, the disclosure of which is totally incorporated herein by reference. Under commercial conditions, they do not possess solubility in current commercial wax-based hot melt or phase-change ink systems. Because they are not metal-complexed to long-chain or waxy moieties, they are difficult to disperse in phase change inks, and if dispersed are not stable long-term, but settle.

Dyes are defined as materials that are soluble in a liquid on a molecular level. As such, a dye has no measurable particle size. In contrast, a pigment is not soluble in a liquid, and must be dispersed in the liquid in particulate form. Many commercially available dyes such as Pigment Red 57:1 and others are provided from the supplier with very large particle sizes and particle size distributions, and in this form are not suitable for use in phase change inks without extensive milling or grinding followed by stabilization with a dispersing agent.

A colorant that is synthesized like conventional pigments but that behaves like a dye in many ways would be highly desirable.

Accordingly, while known materials are suitable for their intended purposes, a need remains for improved colorant materials. In addition, a need remains for colorants with improved solubility or dispersibility in hydrophobic media such as waxes and resins. Further, a need remains for colorants that exhibit stable solubility or dispersibility over time in phase change ink media. Additionally, a need remains for colorants that can be obtained chemically as submicron-sized particles with no need for grinding, dispersing, milling, homogenizing, or similar mechanical methods for reducing particle size. There is also a need for colorants that have a measurable particle size in liquids but that require no milling to reduce the particle size after they are synthesized. In addition, there is a need for colorants that exhibit both pigment-like and dye-like behavior in that they have measurable particle size but in many instances need not be dispersed in the liquid by physical or chemical means.

SUMMARY

Disclosed herein is a colorant comprising a colored laked complex of: (a) a chromogen molecule having at least one: (i) carboxylic acid group, (ii) carboxylate group, (iii) sulfonic acid group, (iv) sulfonate group, or (v) combination thereof, and (b) a polymer, said chromogen molecule and said polymer each being complexed to (c) a metal. Also disclosed herein is a phase change ink comprising: (a) a phase change ink carrier and (b) a colorant comprising a colored laked complex of: (1) a chromogen molecule having at least one: (i) carboxylic acid group, (ii) carboxylate group, (iii) sulfonic acid group, (iv) sulfonate group, or (v) combination thereof, and (2) a polymer, said chromogen molecule and said polymer each being complexed to (3) a metal. Further disclosed herein is a phase change ink comprising: (a) a phase change ink carrier comprising a monoamide, a branched triamide, a tetra-amide, or a mixture thereof; and (b) a colorant comprising a colored laked complex of: (1) a chromogen molecule having at least one: (i) carboxylic acid group, (ii) carboxylate group, (iii) sulfonic acid group, (iv) sulfonate group, or (v) combination thereof, and (2) a maleic anhydride copolymer of the formula

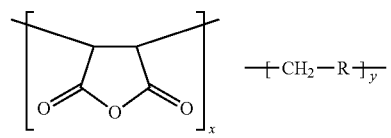

wherein x is an integer representing the number of repeat maleic anhydride units, y is an integer representing the number of repeat —CH₂—R— units, and R is: (i) an alkyl group, including substituted and unsubstituted alkyl groups, and wherein hetero atoms either may or may not be present in the alkyl group; (ii) an aryl group, including substituted and unsubstituted aryl groups, and wherein hetero atoms either may or may not be present in the aryl group; (iii) an arylalkyl group, including substituted and unsubstituted arylalkyl groups, and wherein hetero atoms either may or may not be present in either or both of the alkyl portion and the aryl portion of the arylalkyl group; or (iv) an alkylaryl group, including substituted and unsubstituted alkylaryl groups, and wherein hetero atoms either may or may not be present in either or both of the alkyl portion and the aryl portion of the alkylaryl group; said chromogen molecule and said maleic anhydride copolymer each being complexed to (3) a metal which is Ca, Mg, Al, Sr, Ba Zn, or a combination thereof; said colorant being present in the ink in an amount of from about 0.1 to about 10 percent by weight.

DETAILED DESCRIPTION

Disclosed herein are colorants comprising a colored laked complex of (a) a chromogen molecule having at least one (i) carboxylic acid group, (ii) carboxylate group, (iii) sulfonic acid group, (iv) sulfonate group, or (v) combination thereof, and (b) a polymer, said chromogen molecule and said polymer each being complexed to (c) a metal.

For the purposes of the discussion herein, the term "chromogen" will be used to refer both to groups of atoms that impart color to a molecule and to molecules that are colored. By "color" and "colored" is meant that the molecule absorbs light in the visible, ultraviolet, or infrared wavelength range. A "chromogen molecule" is a molecule that, whether or not it is itself colored, is capable of forming a laked complex with an otherwise uncolored maleic anhydride copolymer or oligomer and/or a carboxylic acid-containing oligomer, polymer, and/or copolymer, and a metal to produce a colored complex.

For purposes of the present discussion, "visible wavelength range" is defined as from about 400 to about 700 nanometers; "ultraviolet wavelength range" is defined as from about 200 to about 400 nanometers; and "infrared wavelength range" is defined as from about 700 to about 1,400 nanometers.

In one embodiment, the chromogen molecule is based on monoazo or disazo dyes. In one specific embodiment, the chromogen molecule is of the Pigment Red 57 family, of the general formula

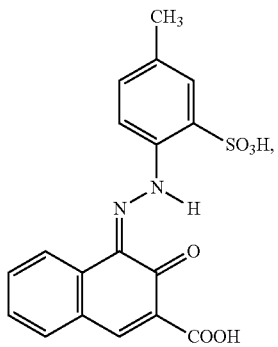

such as C.I. Pigment Red 57:1 (also known as C.I. 15850:1 and Lithol Rubine Red), which is the calcium salt of this molecule, C.I. Pigment Red 57:2 (also known as C.I. 15850:2), which is the barium salt of this molecule, C.I. Pigment Red 57:3 (also known as C.I. 15850:3), which is the mixed calcium/strontium salt of this molecule, C.I. Pigment Red 57 (also known as C.I. 15850), which is the sodium salt of this molecule, or the like, as well as mixtures thereof. Pigment Red 57:1 can be prepared as disclosed in, for example, "British Intelligence Objectives Subcommittee Report 1661," Publication Board No. 86139, Library of Congress, Washington, D.C., 1947, pp. 108-117, the disclosure of which is totally incorporated herein by reference.

In another specific embodiment, the chromogen molecule is based on dyes of the formula

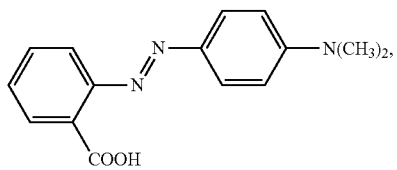 [SMILES: CN(C)c1ccc(/N=N/c2ccccc2C(=O)O)cc1]

such as C.I. 13020 (also known as Acid Red 2), which is the acid form of this molecule, or the like, as well as mixtures thereof.

In another specific embodiment, the chromogen molecule is based on dyes of the formula

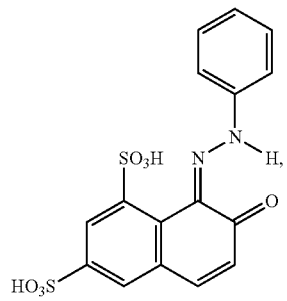

such as C.I. 16230 (also known as Acid Orange 10), which is the acid form of this molecule, C.I. Acid Orange 10:1 (also known as C.I. 16230:2), which is the ammonium salt of this molecule, or the like, as well as mixtures thereof.

In another specific embodiment, the chromogen molecule is based on dyes of the formula

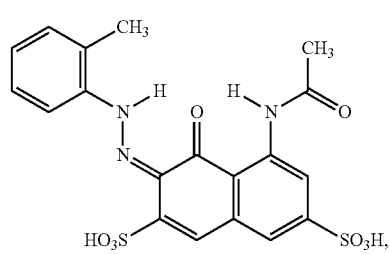 [SMILES: CC(=O)Nc1cc(S(=O)(=O)O)cc2c1C(=O)/C(=N\Nc1ccccc1C)C(S(=O)(=O)O)=C2]

such as C.I. 18065 (also known as Acid Red 35), which is the sodium salt of this molecule, or the like, as well as mixtures thereof.

In another specific embodiment, the chromogen molecule is based on dyes of the formula

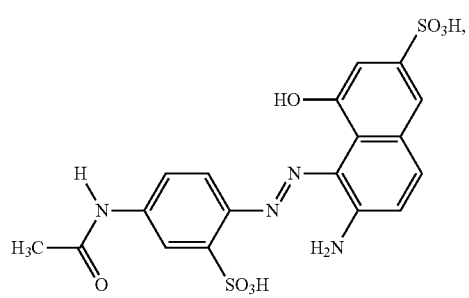 [SMILES: CC(=O)Nc1ccc(/N=N/c2c(N)ccc3cc(S(=O)(=O)O)cc(O)c23)c(S(=O)(=O)O)c1]

such as C.I. 17045 (also known as Acid Red 37), which is the sodium salt of this molecule, or the like, as well as mixtures thereof.

In another specific embodiment, the chromogen molecule is based on dyes of the formula

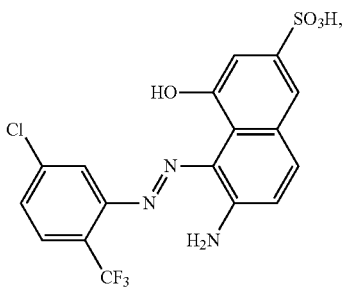 [SMILES: Nc1ccc2cc(S(=O)(=O)O)cc(O)c2c1/N=N/c1cc(Cl)ccc1C(F)(F)F]

such as C.I. 17101 (also known as Acid Red 266), which is the sodium salt of this molecule, or the like, as well as mixtures thereof.

In another specific embodiment, the chromogen molecule is based on dyes of the formula

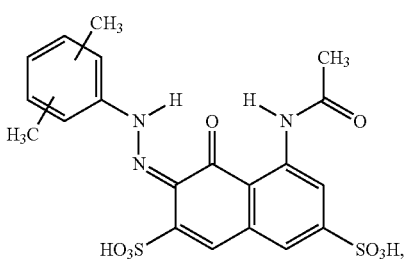

such as C.I. 18070 (also known as Acid Red 40), which is the sodium salt of this molecule, or the like, as well as mixtures thereof.

In another specific embodiment, the chromogen molecule is based on dyes of the formula

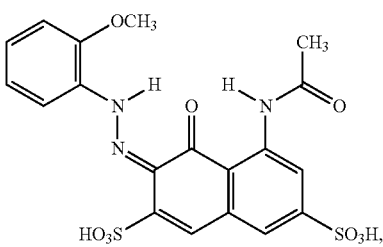 [SMILES: COc1ccccc1N/N=C1\C(=O)c2c(cc(S(=O)(=O)O)cc2NC(C)=O)C=C1S(=O)(=O)O]

such as C.I. 18075 (also known as Acid Violet 12), which is the sodium salt of this molecule, or the like, as well as mixtures thereof.

In another specific embodiment, the chromogen molecule is based on dyes of the formula

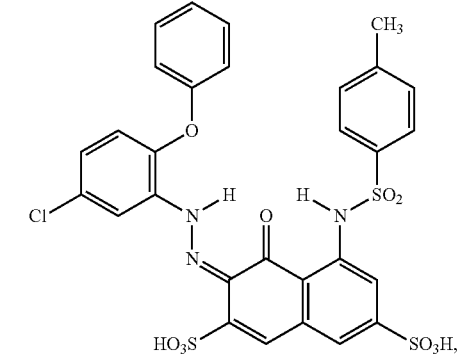 [SMILES: Cc1ccc(S(=O)(=O)Nc2cc(S(=O)(=O)O)cc3c2C(=O)/C(=N\Nc2cc(Cl)ccc2Oc2ccccc2)C(S(=O)(=O)O)=C3)cc1]

such as C.I. 18134 (also known as Acid Red 249), which is the sodium salt of this molecule, or the like, as well as mixtures thereof.

In another specific embodiment, the chromogen molecule is based on dyes of the formula

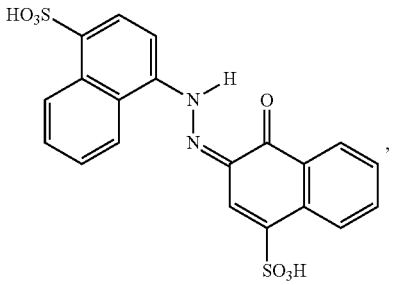 [SMILES: O=C1/C(=N\Nc2ccc(S(=O)(=O)O)c3ccccc23)C=C(S(=O)(=O)O)c2ccccc21]

such as C.I. 14720 (also known as Acid Red 14), which is the sodium salt of this molecule, C.I. 14720:1 (also known as C.I. Food Red 3:1), which is the aluminum salt of this molecule, or the like, as well as mixtures thereof.

In another specific embodiment, the chromogen molecule is based on dyes of the formula

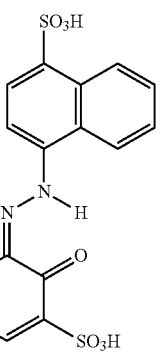

such as C.I. 16185 (also known as Acid Red 27), which is the sodium salt of this molecule, or the like, as well as mixtures thereof.

In another specific embodiment, the chromogen molecule is based on dyes of the formula

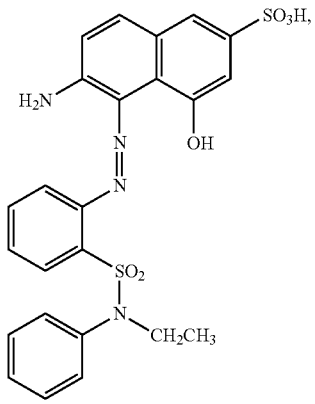 [SMILES: CCN(c1ccccc1)S(=O)(=O)c1ccccc1N=Nc1c(N)ccc2cc(S(=O)(=O)O)cc(O)c12]

such as C.I. 17053 (also known as Acid Red 57), which is the sodium salt of this molecule, or the like, as well as mixtures thereof.

In another specific embodiment, the chromogen molecule is based on dyes of the formula

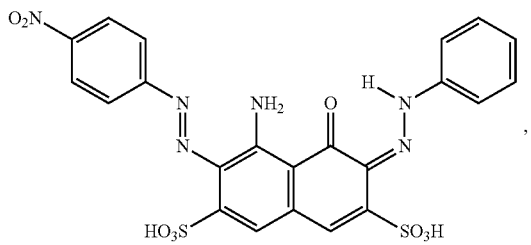 [SMILES: Nc1c(/N=N/c2ccc([N+](=O)[O-])cc2)c(S(=O)(=O)O)cc2c1C(=O)/C(=N\Nc1ccccc1)C(S(=O)(=O)O)=C2]

such as C.I. 20470 (also known as Acid Black 1), which is the sodium salt of this molecule, or the like, as well as mixtures thereof.

In another specific embodiment, the chromogen molecule is based on dyes of the formula

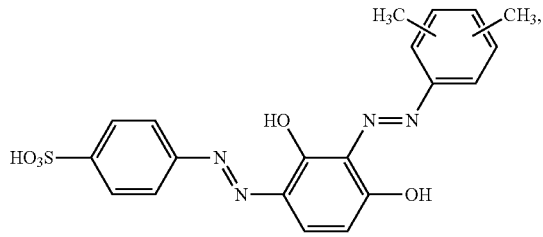

such as C.I. 20170 (also known as Acid Orange 24), which is the sodium salt of this molecule, or the like, as well as mixtures thereof.

In another specific embodiment, the chromogen molecule is based on dyes of the formula

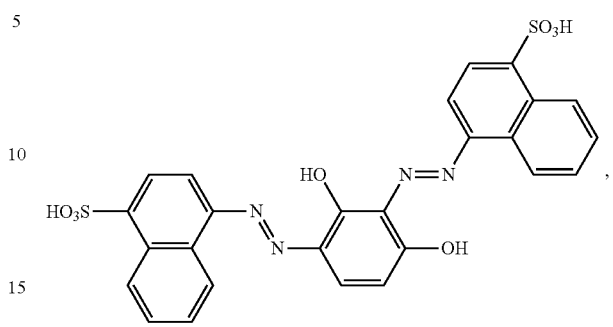

such as C.I. 20195 (also known as Acid Brown 14), which is the sodium salt of this molecule, or the like, as well as mixtures thereof.

In another specific embodiment, the chromogen molecule is based on dyes of the formula

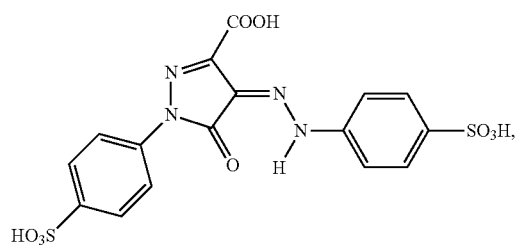

such as C.I. 19140 (also known as Tartrazine, Acid Yellow 23, FD&C Yellow 5, and Food Yellow 4), which is the sodium salt of this molecule, C.I. 19140:1 (also known as Acid Yellow 23:1), which is the aluminum salt of this molecule, or the like, as well as mixtures thereof.

In another specific embodiment, the chromogen molecule is based on dyes of the formula

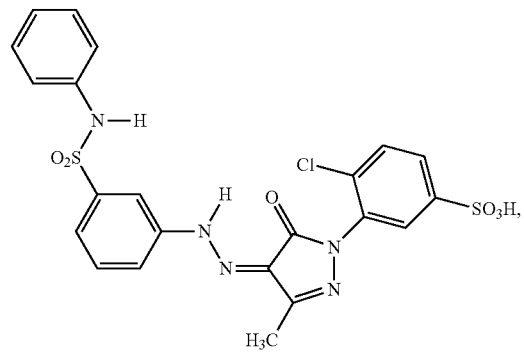 [SMILES: CC1=NN(c2cc(S(=O)(=O)O)ccc2Cl)C(=O)/C1=N\Nc1cccc(S(=O)(=O)Nc2ccccc2)c1]

such as C.I. 18900 (also known as Acid Yellow 29), which is the sodium salt of this molecule, or the like, as well as mixtures thereof.

In another specific embodiment, the chromogen molecule is based on dyes of the formula

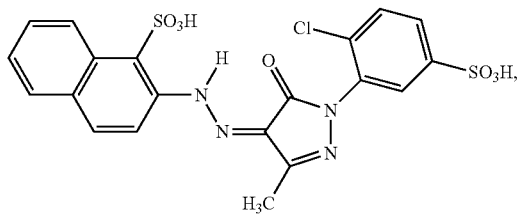 [SMILES: CC1=NN(c2cc(S(=O)(=O)O)ccc2Cl)C(=O)/C1=N\Nc1ccc2ccccc2c1S(=O)(=O)O]

such as C.I. 18930 (also known as Acid Yellow 200), which is the sodium salt of this molecule, or the like, as well as mixtures thereof.

In another specific embodiment, the chromogen molecule is based on dyes of the formula

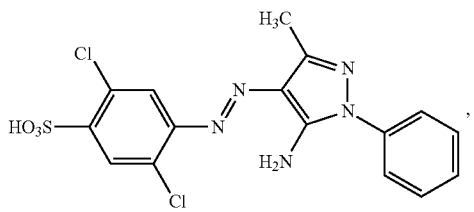 [SMILES: Cc1nn(-c2ccccc2)c(N)c1/N=N/c1cc(Cl)c(S(=O)(=O)O)cc1Cl]

such as C.I. 18640 (also known as Acid Yellow 49), which is the sodium salt of this molecule, or the like, as well as mixtures thereof.

In another specific embodiment, the chromogen molecule is based on phthalocyanine dyes, such as those of the general formula

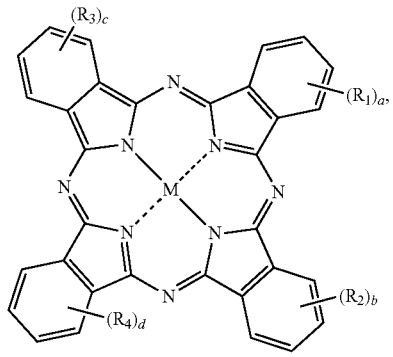

wherein a, b, c, and d each, independently of the others, are integers of 0, 1, 2, 3, or 4, $R_1$, $R_2$, $R_3$, and $R_4$ each, independently of the others, can be:

(i) alkyl groups (including linear, branched, saturated, unsaturated, cyclic, substituted, and unsubstituted alkyl groups, and wherein hetero atoms, such as oxygen, nitrogen, sulfur, silicon, phosphorus, boron, or the like either may or may not be present in the alkyl group), in one embodiment with at least 1 carbon atom, and in one embodiment with no more than about 50 carbon atoms, in another embodiment with no more than about 30 carbon atoms, and in yet another embodiment with no more than about 18 carbon atoms, although the number of carbon atoms can be outside of these ranges;

(ii) aryl groups (including unsubstituted and substituted aryl groups, and wherein hetero atoms, such as oxygen, nitrogen, sulfur, silicon, phosphorus, boron, or the like either may or may not be present in the aryl group), in one embodiment with at least about 6 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges;

(iii) arylalkyl groups (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the arylalkyl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as benzyl or the like;

(iv) alkylaryl groups (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the alkylaryl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as tolyl or the like;

(v) halogen atoms, such as fluorine, chlorine, bromine, iodine, or the like;

(vi) ester groups;

(vii) amide groups;

(viii) sulfone groups;

(ix) amine or ammonium groups;

(x) nitrile groups;

(xi) nitro groups;

(xii) hydroxy groups;

(xiii) mercapto (thiol) groups;

(xiv) cyano groups;

(xv) pyridine or pyridinium groups;

(xvi) ether groups;

(xvii) thioether groups;

(xviii) aldehyde groups;

(xix) ketone groups;

(xx) carbonyl groups;

(xxi) thiocarbonyl groups;

(xxii) sulfate groups;

(xxiii) sulfide groups;

(xxiv) sulfoxide groups;

(xxv) phosphine or phosphonium groups;

(xxvi) phosphate groups;

(xxvii) nitroso groups;

(xxviii) acyl groups;

(xxix) acid anhydride groups;

(xxx) azide groups;

(xxxi) azo groups;

(xxxii) cyanato groups;

(xxxiii) isocyanato groups;

(xxxiv) thiocyanato groups;

(xxxv) isothiocyanato groups;

(xxxvi) urethane (carbamate) groups;

(xxxvii) urea (carbamide) groups;

(xxxviii) carboxylic acid or carboxylate groups; or (xxxix) sulfonic acid or sulfonate groups; or the like, as well as combinations thereof;

wherein $R_1$, $R_2$, $R_3$, and $R_4$ can each be joined to a ring in the central structure;

wherein two or more of $R_1$, $R_2$, $R_3$, and $R_4$ can be joined together to form a ring;

and M is an atom or group of atoms capable of bonding to the central cavity of a phthalocyanine molecule, wherein axial ligands optionally can be attached to M. About seventy atoms or groups are known to bond in the central cavity of a phthalocyanine molecule, as disclosed in, for example, *Phthalocyanine Materials*, N. B. McKeown, Cambridge University Press (1998), Chapter 1, Table 1.1, the disclosure of which is totally incorporated herein by reference, including, but not limited to, two hydrogen, lithium, sodium, or potassium atoms; a divalent metal atom, such as beryllium, magnesium, calcium, strontium, barium, chromium, manganese, iron, cobalt, nickel, copper, zinc, tin, lead, cadmium, or the like, as well as mixtures thereof; a divalent halometal or -metalloid group, such as chloroiron(III), chlorotitanium(III), chlorochromium(III), chloroaluminum, chlorogallium, chloroindium, chlorophosphorus(III), dichlorotitanium(IV), dichlorosilicon, dichlorogermanium, dichlorotin, or the like, as well as the corresponding fluorides, bromides, and iodides and mixtures thereof; a divalent hydroxy metal group, such as hydroxyaluminum, hydroxygallium, dihydroxysilicon, dihydroxygermanium, dihydroxytin, or the like as well as mixtures thereof; a divalent oxo-metal group, such as oxo-molybdenum(IV), oxo-vanadium(IV), oxo-titanium(IV), or the like as well as mixtures thereof; a divalent metal- or metalloidal-oxyhydrocarbon group, such as alkoxyaluminum, alkoxygallium, dialkoxysilicon, diaryloxygermanium, or the like as well as mixtures thereof, wherein the oxyhydrocarbon group is an oxyalkyl group, an oxyaryl group, an oxyalkylaryl group, an oxyarylalkyl group, an oxyheterocyclic group, or mixtures thereof, and typically (although not necessarily) contains from one to about twenty carbon atoms; or the like, as well as mixtures thereof; wherein examples of the substituents on the substituted alkyl, aryl, arylalkyl, and alkylaryl groups include (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, silyl groups, siloxyl groups, silane groups, mixtures thereof, or the like, wherein two or more substituents can be joined together to form a ring. Specific examples include those of the formula

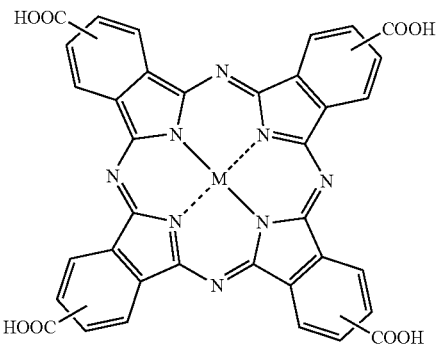

wherein M is $Cu^{2+}$, $Zn^{2+}$, or mixtures thereof, those of the formula

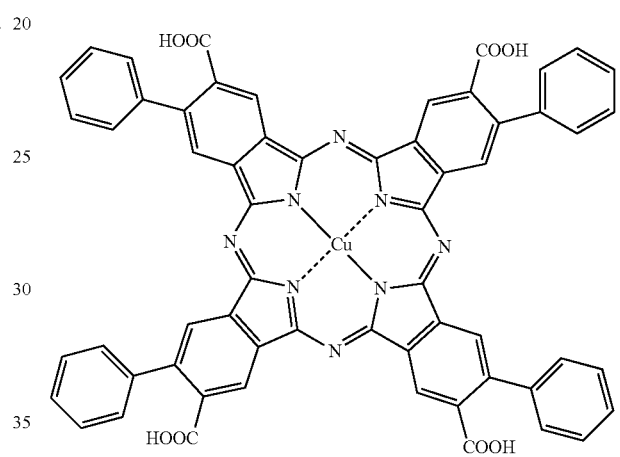

such as C.I. 74320, which is the sodium salt of this molecule, or the like, as well as mixtures thereof. Dyes of this formula can be prepared as disclosed in, for example, British Patent 464,126 and J. Griffiths et al., "Some Observations on the Synthesis of Polysubstituted Zinc Phthalocyanine Sensitizers for Photodynamic Therapy," *Dyes and Pigments*, Vol. 33, No. 1, pp. 65-78, 1997, the disclosures of each of which are totally incorporated herein by reference.

In another specific embodiment, the chromogen molecule is based on rhodamine dyes, such as those of the general formula

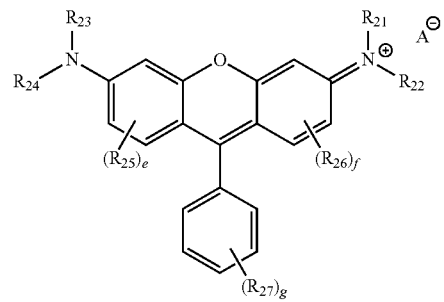

wherein:

$R_{21}$, $R_{22}$, $R_{23}$, and $R_{24}$ each, independently of the others, can be:
  (i) hydrogen atoms;
  (ii) alkyl groups (including linear, branched, saturated, unsaturated, cyclic, substituted, and unsubstituted alkyl groups, and wherein hetero atoms, such as oxygen, nitrogen, sulfur, silicon, phosphorus, boron, or the like either may or may not be present in the alkyl group), in one embodiment with at least 1 carbon atom, and in one embodiment with no more than about 55 carbon atoms, in another embodiment with no more than about 30 carbon atoms, and in yet another embodiment with no more than about 20 carbon atoms, although the number of carbon atoms can be outside of these ranges;
  (iii) aryl groups (including unsubstituted and substituted aryl groups, and wherein hetero atoms, such as oxygen, nitrogen, sulfur, silicon, phosphorus, boron, or the like either may or may not be present in the aryl group), in one embodiment with at least about 5 carbon atoms, and in another embodiment with at least about 6 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges;
  (iv) arylalkyl groups (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like; or
  (v) alkylaryl groups (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like;
  wherein $R_{21}$ and $R_{22}$ can be joined together to form a ring, wherein $R_{23}$ and $R_{24}$ can be joined together to form a ring, and wherein $R_{21}$, $R_{52}$, $R_{23}$, and $R_{24}$ can each be joined to a phenyl ring in the central structure;

e and f each, independently of the other, is an integer which is 0, 1, or 2;

g is an integer which is 0, 1, 2, 3, or 4;

each of $R_{25}$, $R_{26}$, and $R_{27}$, independently of the others, can be:
  (i) alkyl groups (including linear, branched, saturated, unsaturated, cyclic, substituted, and unsubstituted alkyl groups, and wherein hetero atoms, such as oxygen, nitrogen, sulfur, silicon, phosphorus, boron, or the like either may or may not be present in the alkyl group), in one embodiment with at least 1 carbon atom, and in one embodiment with no more than about 50 carbon atoms, in another embodiment with no more than about 30 carbon atoms, and in yet another embodiment with no more than about 18 carbon atoms, although the number of carbon atoms can be outside of these ranges;
  (ii) aryl groups (including unsubstituted and substituted aryl groups, and wherein hetero atoms, such as oxygen, nitrogen, sulfur, silicon, phosphorus, boron, or the like either may or may not be present in the aryl group), in one embodiment with at least about 6 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges;
  (iii) arylalkyl groups (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the arylalkyl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as benzyl or the like;
  (iv) alkylaryl groups (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the alkylaryl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as tolyl or the like;
  (v) halogen atoms, such as fluorine, chlorine, bromine, iodine, or the like;
  (vi) ester groups;
  (vii) amide groups;
  (viii) sulfone groups;
  (ix) amine or ammonium groups;
  (x) nitrile groups;
  (xi) nitro groups;
  (xii) hydroxy groups;
  (xiii) mercapto (thiol) groups;
  (xiv) cyano groups;
  (xv) pyridine or pyridinium groups;
  (xvi) ether groups;
  (xvii) thioether groups;
  (xviii) aldehyde groups;
  (xix) ketone groups;

(xx) carbonyl groups;
(xxi) thiocarbonyl groups;
(xxii) sulfate groups;
(xxiii) sulfide groups;
(xxiv) sulfoxide groups;
(xxv) phosphine or phosphonium groups;
(xxvi) phosphate groups;
(xxvii) nitroso groups;
(xxviii) acyl groups;
(xxix) acid anhydride groups;
(xxx) azide groups;
(xxxi) azo groups;
(xxxii) cyanato groups;
(xxxiii) isocyanato groups;
(xxxiv) thiocyanato groups;
(xxxv) isothiocyanato groups;
(xxxvi) urethane (carbamate) groups;
(xxxvii) urea (carbamide) groups;
(xxxviii) carboxylic acid or carboxylate groups; or
(xxxix) sulfonic acid or sulfonate groups;

wherein $R_{25}$, $R_{26}$, and $R_{27}$ can each be joined to a phenyl ring in the central structure;

and A is an anion, with examples of suitable anions including (but not being limited to) $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_3^-$, $NO_3^-$, $HCOO^-$, $CH_3COO^-$, $H_2PO_4^-$, $HPO_4^{2-}$, $SON^-$, $BF_4^-$, $ClO_4^-$, $SSO_3^-$, $PF_6^-$, $SbCl_6^-$, or the like, as well as mixtures thereof;

wherein examples of the substituents on the substituted alkyl, aryl, arylalkyl, and alkylaryl groups include (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, silyl groups, siloxyl groups, silane groups, mixtures thereof, or the like, wherein two or more substituents can be joined together to form a ring. Specific examples of chromogen molecules based on rhodamine dyes include those of the formula

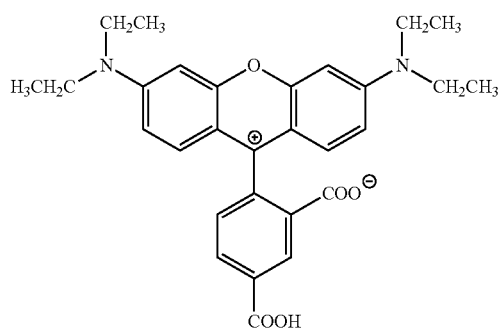

such as C.I. Acid Red 388 or the like, as well as mixtures thereof.

In another specific embodiment, the chromogen molecule is based on anthraquinone dyes, such as those of the general formula

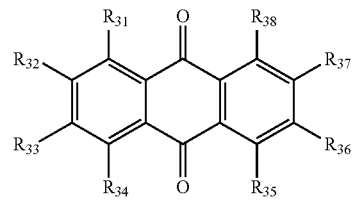

wherein:
$R_{31}$, $R_{32}$, $R_{33}$, $R_{34}$, $R_{35}$, $R_{36}$, $R_{37}$, and $R_{38}$ each, independently of the others, can be:
(i) hydrogen atoms;
(ii) alkyl groups (including linear, branched, saturated, unsaturated, cyclic, substituted, and unsubstituted alkyl groups, and wherein hetero atoms, such as oxygen, nitrogen, sulfur, silicon, phosphorus, boron, or the like either may or may not be present in the alkyl group), in one embodiment with at least 1 carbon atom, and in one embodiment with no more than about 50 carbon atoms, in another embodiment with no more than about 30 carbon atoms, and in yet another embodiment with no more than about 18 carbon atoms, although the number of carbon atoms can be outside of these ranges;
(iii) aryl groups (including unsubstituted and substituted aryl groups, and wherein hetero atoms, such as oxygen, nitrogen, sulfur, silicon, phosphorus, boron, or the like either may or may not be present in the aryl group), in one embodiment with at least about 6 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges;
(iv) arylalkyl groups (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the arylalkyl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as benzyl or the like;
(v) alkylaryl groups (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the alkylaryl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as tolyl or the like;
(vi) halogen atoms, such as fluorine, chlorine, bromine, iodine, or the like;
(vii) ester groups;
(viii) amide groups;

(ix) sulfone groups;

(x) amine or ammonium groups;

(xi) nitrile groups;

(xii) nitro groups;

(xiii) hydroxy groups;

(xiv) mercapto (thiol) groups;

(xv) cyano groups;

(xvi) pyridine or pyridinium groups;

(xvii) ether groups;

(xviii) thioether groups;

(xix) aldehyde groups;

(xx) ketone groups;

(xxi) carbonyl groups;

(xxii) thiocarbonyl groups;

(xxiii) sulfate groups;

(xxiv) sulfide groups;

(xxv) sulfoxide groups;

(xxvi) phosphine or phosphonium groups;

(xxvii) phosphate groups;

(xxviii) nitroso groups;

(xxix) acyl groups;

(xxx) acid anhydride groups;

(xxxi) azide groups;

(xxxii) azo groups;

(xxxiii) cyanato groups;

(xxxiv) isocyanato groups;

(xxxv) thiocyanato groups;

(xxxvi) isothiocyanato groups;

(xxxvii) urethane (carbamate) groups;

(xxxviii) urea (carbamide) groups;

(xxxix) carboxylic acid or carboxylate groups; or (xl) sulfonic acid or sulfonate groups;

wherein $R_{31}$, $R_{32}$, $R_{33}$, $R_{34}$, $R_{35}$, $R_{36}$, $R_{37}$, and $R_{38}$ can each be joined to a ring in the central structure;

wherein two or more of $R_{31}$, $R_{32}$, $R_{33}$, $R_{34}$, $R_{35}$, $R_{36}$, $R_{37}$, and $R_{38}$ can be joined together to form a ring;

wherein examples of the substituents on the substituted alkyl, aryl, arylalkyl, and alkylaryl groups include (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, silyl groups, siloxyl groups, silane groups, mixtures thereof, or the like, wherein two or more substituents can be joined together to form a ring. Specific examples of chromogen molecules based on anthraquinone dyes include those of the formula

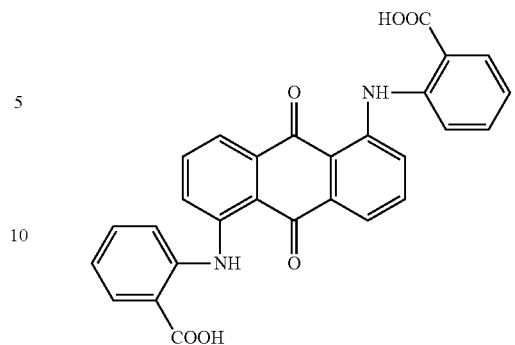

such as C.I. 61720, or the like, as well as mixtures thereof.

Other classes of dyes or pigments can also be employed as the chromogen molecule, including (but not limited to) nitroso, nitro, stilbene, diarylmethane, triarylmethane, xanthene, acridine, quinoline, methine, thiazole, indamine, indophenole, azine, oxazine, thiazine, aminoketone, indigoid, or the like, as well as mixtures thereof, provided that the selected chromogen molecule can form a complex with the polymer and the metal.

The colorants disclosed herein also comprise a polymer. Any polymer is suitable provided that it can form a laked complex with a chromogen molecule and a metal. Suitable polymers include homopolymers and copolymers. For the purposes of the colorants disclosed herein, the term "copolymer" includes polymers comprising two different monomers, terpolymers (i.e., polymers comprising three different monomers), tetrapolymers (polymers comprising four different monomers), polymers comprising five or more different monomers, or the like. In addition, the terms "polymer" and "copolymer" also include oligomers (i.e., polymers having from about 4 to about 40 repeat monomer units) as well as higher polymers. Block, random, alternating, or the like polymers can be used, as well as mixtures thereof. The selected polymer is capable of forming a laked complex with a metal and enables dissolution or dispersion of the complex of polymer, chromogen molecule, and metal in a hydrophobic medium.

Specific examples of suitable polymers include maleic anhydride copolymers, including (but not limited to) those of the general formula

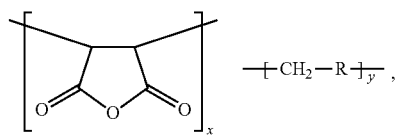

maleic anhydride-maleic half ester copolymers, including (but not limited to) those of the general formula

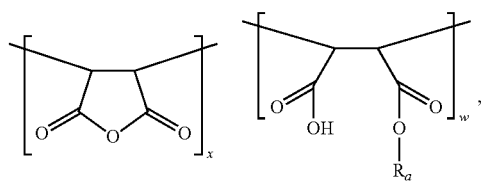

maleic half ester copolymers, including (but not limited to) those of the general formula

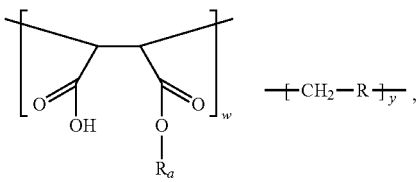

maleic half ester homopolymers, including (but not limited to) those of the general formula

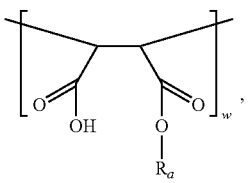

acrylic acid-acrylic ester copolymers, including (but not limited to) those of the general formula

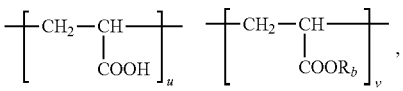

methacrylic acid-methacrylic ester copolymers, including (but not limited to) those of the general formula

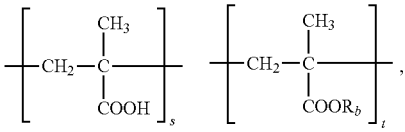

maleic anhydride-acrylic acid copolymers, including (but not limited to) those of the general formula

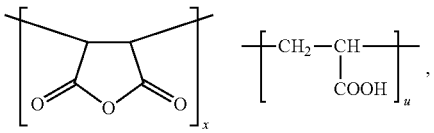

maleic anhydride-methacrylic acid copolymers, including (but not limited to) those of the general formula

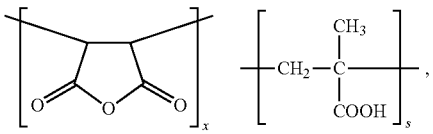

maleic anhydride-acrylic ester copolymers, including (but not limited to) those of the general formula

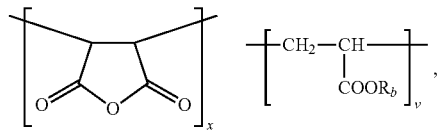

maleic anhydride-methacrylic ester copolymers, including (but not limited to) those of the general formula

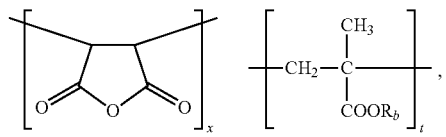

or the like, as well as other similar combinations of like monomers, wherein:

s is an integer representing the number of repeat methacrylic acid units, and is in one embodiment at least about 1, in another embodiment at least about 2, and in yet another embodiment at least about 3, and in one embodiment no more than about 20, in another embodiment no more than about 15, and in yet another embodiment no more than about 10, although the value of x can be outside of these ranges;

t is an integer representing the number of repeat methacrylic ester units, and is in one embodiment at least about 1, in another embodiment at least about 2, and in yet another embodiment at least about 3, and in one embodiment no more than about 20, in another embodiment no more than about 15, and in yet another embodiment no more than about 10, although the value of x can be outside of these ranges;

u is an integer representing the number of repeat acrylic acid units, and is in one embodiment at least about 1, in another embodiment at least about 2, and in yet another embodiment at least about 3, and in one embodiment no more than about 20, in another embodiment no more than about 15, and in yet another embodiment no more than about 10, although the value of x can be outside of these ranges;

v is an integer representing the number of repeat acrylic ester units, and is in one embodiment at least about 1, in another embodiment at least about 2, and in yet another embodiment at least about 3, and in one embodiment no more than about 20, in another embodiment no more than about 15, and in yet another embodiment no more than about 10, although the value of x can be outside of these ranges;

w is an integer representing the number of repeat maleic half ester units, and is in one embodiment at least about 1, in another embodiment at least about 2, and in yet another embodiment at least about 3, and in one embodiment no more than about 20, in another embodiment no more than about 15, and in yet another embodiment no more than about 10, although the value of x can be outside of these ranges;

x is an integer representing the number of repeat maleic anhydride units, and is in one embodiment at least about 1, in another embodiment at least about 2, and in yet another embodiment at least about 3, and in one embodiment no more than about 20, in another embodiment no more than about 15, and in yet another embodiment no more than about 10, although the value of x can be outside of these ranges;

y is an integer representing the number of repeat —$CH_2$— R— units, and is in one embodiment at least about 1, in another embodiment at least about 2, and in yet another embodiment at least about 3, and in one embodiment no more than about 20, in another embodiment no more than about 15, and in yet another embodiment no more than about 10, although the value of x can be outside of these ranges;

R is:
(1) an alkyl group, including linear, branched, saturated, unsaturated, cyclic, substituted, and unsubstituted alkyl groups, and wherein hetero atoms, such as oxygen, nitrogen, sulfur, silicon, phosphorus, boron, or the like either may or may not be present in the alkyl group, in one embodiment with at least about 4 carbon atoms, in another embodiment with at least about 8 carbon atoms, and in yet another embodiment with at least about 12 carbon atoms, and in one embodiment with no more than about 50 carbon atoms, in another embodiment with no more than about 40 carbon atoms, and in yet another embodiment with no more than about 30 carbon atoms, although the number of carbon atoms can be outside of these ranges;
(2) an aryl group, including substituted and unsubstituted aryl groups, and wherein hetero atoms, such as oxygen, nitrogen, sulfur, silicon, phosphorus, boron, or the like either may or may not be present in the aryl group, in one embodiment with at least about 5 carbon atoms, and in another embodiment with at least about 6 carbon atoms, and in one embodiment with no more than about 18 carbon atoms, in another embodiment with no more than about 14 carbon atoms, and in yet another embodiment with no more than about 10 carbon atoms, although the number of carbon atoms can be outside of these ranges, such as phenyl or the like;
(3) an arylalkyl group, including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the arylalkyl group, in one embodiment with at least about 6 carbon atoms, and in another embodiment with at least about 7 carbon atoms, and in one embodiment with no more than about 30 carbon atoms, in another embodiment with no more than about 14 carbon atoms, and in yet another embodiment with no more than about 10 carbon atoms, although the number of carbon atoms can be outside of these ranges, such as benzyl or the like; or
(4) an alkylaryl group, including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the alkylaryl group, in one embodiment with at least about 6 carbon atoms, and in another embodiment with at least about 7 carbon atoms, and in one embodiment with no more than about 30 carbon atoms, in another embodiment with no more than about 14 carbon atoms, and in yet another embodiment with no more than about 10 carbon atoms, although the number of carbon atoms can be outside of these ranges, such as tolyl or the like;

$R_a$ is:
(1) an alkyl group, including linear, branched, saturated, unsaturated, cyclic, substituted, and unsubstituted alkyl groups, and wherein hetero atoms, such as oxygen, nitrogen, sulfur, silicon, phosphorus, boron, or the like either may or may not be present in the alkyl group, in one embodiment with at least about 4 carbon atoms, in another embodiment with at least about 8 carbon atoms, and in yet another embodiment with at least about 12 carbon atoms, and in one embodiment with no more than about 50 carbon atoms, in another embodiment with no more than about 40 carbon atoms, and in yet another embodiment with no more than about 30 carbon atoms, although the number of carbon atoms can be outside of these ranges;
(2) an aryl group, including substituted and unsubstituted aryl groups, and wherein hetero atoms, such as oxygen, nitrogen, sulfur, silicon, phosphorus, boron, or the like either may or may not be present in the aryl group, in one embodiment with at least about 5 carbon atoms, and in another embodiment with at least about 6 carbon atoms, and in one embodiment with no more than about 18 carbon atoms, in another embodiment with no more than about 14 carbon atoms, and in yet another embodiment with no more than about 10 carbon atoms, although the number of carbon atoms can be outside of these ranges, such as phenyl or the like;
(3) an arylalkyl group, including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the arylalkyl group, in one embodiment with at least about 6 carbon atoms, and in another embodiment with at least about 7 carbon atoms, and in one embodiment with no more than about 30 carbon atoms, in another embodiment with no more than about 14 carbon atoms, and in yet another embodiment with no more than about 10 carbon atoms, although the number of carbon atoms can be outside of these ranges, such as benzyl or the like; or
(4) an alkylaryl group, including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the alkylaryl group, in one embodiment with at least about 6 carbon atoms, and in another embodiment with at least about 7 carbon atoms, and in one embodiment with no more than about 30 carbon atoms, in another embodiment with no more than about 14 carbon atoms, and in yet another embodiment with no more than about 10 carbon atoms, although the number of carbon atoms can be outside of these ranges, such as tolyl or the like;

$R_b$ is:
(1) an alkyl group, including linear, branched, saturated, unsaturated, cyclic, substituted, and unsubstituted alkyl groups, and wherein hetero atoms, such as oxygen, nitrogen, sulfur, silicon, phosphorus, boron, or the like either may or may not be present in the alkyl group, in one embodiment with at least about 4 carbon atoms, in another embodiment with at least about 8 carbon atoms, and in yet another embodiment with at least about 12 carbon atoms, and in one embodiment with no more than about 50 carbon atoms, in another embodiment with no more than about 40 carbon atoms, and in yet another embodiment with no more than about 30 carbon atoms, although the number of carbon atoms can be outside of these ranges;
(2) an aryl group, including substituted and unsubstituted aryl groups, and wherein hetero atoms, such as oxygen, nitrogen, sulfur, silicon, phosphorus, boron, or the like either may or may not be present in the aryl group, in one embodiment with at least about 5 carbon atoms, and in another embodiment with at least about 6 carbon atoms, and in one embodiment with no more than about 18 carbon atoms, in another embodiment with no more than about 14 carbon atoms, and in yet another embodiment with no more than about 10 carbon atoms, although the number of carbon atoms can be outside of these ranges, such as phenyl or the like;

(3) an arylalkyl group, including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the arylalkyl group, in one embodiment with at least about 6 carbon atoms, and in another embodiment with at least about 7 carbon atoms, and in one embodiment with no more than about 30 carbon atoms, in another embodiment with no more than about 14 carbon atoms, and in yet another embodiment with no more than about 10 carbon atoms, although the number of carbon atoms can be outside of these ranges, such as benzyl or the like; or (4) an alkylaryl group, including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the alkylaryl group, in one embodiment with at least about 6 carbon atoms, and in another embodiment with at least about 7 carbon atoms, and in one embodiment with no more than about 30 carbon atoms, in another embodiment with no more than about 14 carbon atoms, and in yet another embodiment with no more than about 10 carbon atoms, although the number of carbon atoms can be outside of these ranges, such as tolyl or the like;

wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, silyl groups, siloxyl groups, silane groups, mixtures thereof, or the like, wherein two or more substituents can be joined together to form a ring.

In one specific embodiment, the polymer is a maleic anhydride copolymer of the formula

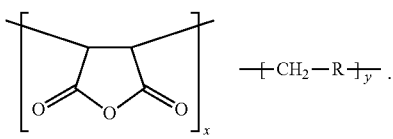

Examples of suitable copolymers include, but are not limited to: (a) alpha-olefin/maleic anhydride copolymers, wherein

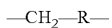

is

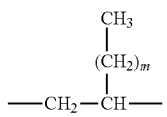

wherein m is an integer representing the number of repeat —$CH_2$— units, and is in one embodiment at least about 3, in another embodiment at least about 7, and in yet another embodiment at least about 11, and in one embodiment no more than about 50, in another embodiment no more than about 40, and in yet another embodiment no more than about 30, although the value of m can be outside of these ranges. Specific examples of suitable materials of this formula include Q-0048, wherein m is 11 and x and y each have an average value of about 25, X5399, wherein m is an integer of from about 21 to about 25 and x and y each have an average value of about 10, and X-5400, wherein m is 27 and x and y each have an average value of about 13, all available from Baker-Petrolite; (b) styrene/maleic anhydride copolymers, wherein

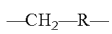

is

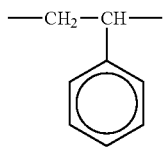

specific examples of suitable materials of this formula include SMA 1000, SMA 2000, and SMA 3000, available from Atochem Inc., Malvern Pa., or the like, as well as mixtures thereof; (c) ethylene/maleic anhydride copolymers, wherein

is

specific examples of suitable materials of this formula include those available from Zeeland Chemical Co., Zeeland, Mich., or the like, as well as mixtures thereof; (d) isopropylene/maleic anhydride copolymers, wherein

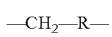

is

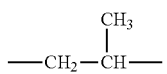

specific examples of suitable materials of this formula include those available from Zeeland Chemical Co., or the like, as well as mixtures thereof; (e) polybutadiene/maleic anhydride copolymers, wherein

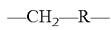

is

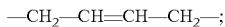

specific examples of suitable materials of this formula include those available from Polyscience Corp., Rockland, Mass., or the like, as well as mixtures thereof; (f) polymethylvinylether/maleic anhydride copolymers, wherein

—$CH_2$—R— is

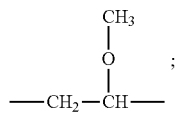

specific examples of suitable materials of this formula include those available from International Specialty Products, Bound Brook, N.J., or the like, as well as mixtures thereof; (g) isobutylene/maleic anhydride copolymers, wherein

—$CH_2$—R— is

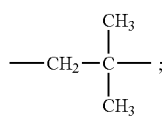

specific examples of suitable materials of this formula include those available from Ken Seika Corp., Rumson N.J., or the like; as well as mixtures thereof; (h) various vinyl/maleic anhydride copolymers, wherein

—$CH_2$—R— is

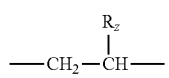

wherein $R_1$ is:

(1) an alkyl group, including linear, branched, saturated, unsaturated, cyclic, substituted, and unsubstituted alkyl groups, and wherein hetero atoms, such as oxygen, nitrogen, sulfur, silicon, phosphorus, boron, or the like either may or may not be present in the alkyl group, in one embodiment with at least about 4 carbon atoms, in another embodiment with at least about 8 carbon atoms, and in yet another embodiment with at least about 12 carbon atoms, and in one embodiment with no more than about 50 carbon atoms, in another embodiment with no more than about 40 carbon atoms, and in yet another embodiment with no more than about 30 carbon atoms, although the number of carbon atoms can be outside of these ranges;

(2) an aryl group, including substituted and unsubstituted aryl groups, and wherein hetero atoms, such as oxygen, nitrogen, sulfur, silicon, phosphorus, boron, or the like either may or may not be present in the aryl group, in one embodiment with at least about 5 carbon atoms, and in another embodiment with at least about 6 carbon atoms, and in one embodiment with no more than about 18 carbon atoms, in another embodiment with no more than about 14 carbon atoms, and in yet another embodiment with no more than about 10 carbon atoms, although the number of carbon atoms can be outside of these ranges, such as phenyl or the like;

(3) an arylalkyl group, including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the arylalkyl group, in one embodiment with at least about 6 carbon atoms, and in another embodiment with at least about 7 carbon atoms, and in one embodiment with no more than about 30 carbon atoms, in another embodiment with no more than about 14 carbon atoms, and in yet another embodiment with no more than about 10 carbon atoms, although the number of carbon atoms can be outside of these ranges, such as benzyl or the like; or (4) an alkylaryl group, including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the alkylaryl group, in one embodiment with at least about 6 carbon atoms, and in another embodiment with at least about 7 carbon atoms, and in one embodiment with no more than about 30 carbon atoms, in another embodiment with no more than about 14 carbon atoms, and in yet another embodiment with no more than about 10 carbon atoms, although the number of carbon atoms can be outside of these ranges, such as tolyl or the like;

wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, silyl groups, siloxyl groups, silane groups, mixtures thereof, or the like, wherein two or more substituents can be joined together to form a ring. Specific examples of suitable materials of this formula include those available from Baker Petrolite Corp. or the like, as well as mixtures thereof; (i) acrylic acid/maleic anhydride copolymers, wherein

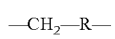

is

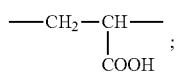

specific examples of suitable materials of this formula include those available from Aldrich Chemical Corp. or the like; as well as mixtures thereof; (j) methacrylic acid/maleic anhydride copolymers, wherein

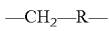

is

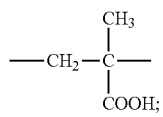

specific examples of suitable materials of this formula include those available from Aldrich Chemical Corp. or the like; as well as mixtures thereof.

The chromogen and the polymer form a laked complex with a metal. Examples of suitable metals include (but are not limited to) Ca, Mg, Al, Sr, Ba Zn, or the like, as well as mixtures thereof. Variation of the metal can enable fine-tuning of the color of the colorant.

While not being limited to any specific theory, it is believed that a complex forms between the chromogen molecule, the polymer, and the metal as follows (illustrated here for a maleic anhydride copolymer):

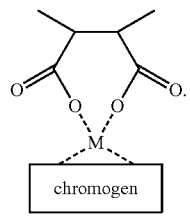

Two coordination bonds between the chromogen molecule and the metal are shown by way of example; it is to be understood that fewer or more such bonds may exist. Again while not being limited to any specific theory, it is believed that the percentage of monomers complexed to a metal is in one embodiment at least about 0.5%, in another embodiment at least about 1%, and in yet another embodiment at least about 3%, and in one embodiment no more than about 50%, in another embodiment no more than about 30%, and in yet another embodiment no more than about 20%, although the percentage can be outside of these ranges.

In the formed laked complex, the chromogen molecule is present in an amount of in one embodiment at least about 1 mole of maleic anhydride/acid moiety per one mole of chromogen molecule, in another embodiment at least about 2 moles of maleic anhydride/acid moiety per one mole of chromogen molecule, and in yet another embodiment at least about 3 moles of maleic anhydride/acid moiety per one mole of chromogen molecule, and in one embodiment no more than about 50 moles of maleic anhydride/acid moiety per one mole of chromogen molecule, in another embodiment no more than about 30 moles of maleic anhydride/acid moiety per one mole of chromogen molecule, and in yet another embodiment no more than about 20 moles of maleic anhydride/acid moiety per one mole of chromogen molecule, although the relative amounts can be outside of these ranges.

Formation of the lake complex can be by any desired or effective method. In one embodiment, for example, the polymer can first be dissolved or dispersed in a first solvent and heated, followed by addition of the metal (usually in salt form), typically in a second solvent which is often, although not necessarily, initially immiscible with the first solvent, followed by addition of the dye, optionally in a solvent as well. A base such as NaOH, KOH, LiOH, $NH_3$, or any other base that doesn't form a lake with the dye but which has a cation that can be replaced by a laking cation from the metal, is added to the mixture to solubilize the dye and enable replacement of the cation with the laking cation. Thereafter, the solvents can be distilled off to yield the product.

Examples of suitable solvents for the polymer include toluene, hexanes, heptanes, xylene, mesitylene, ISOPAR® E, or the like, as well as mixtures thereof. The polymer is present in the solvent in any desired or effective amount, in one embodiment at least about 1% by weight, in another embodiment at least about 3% by weight, and in yet another embodiment at least about 5% by weight, and in one embodiment no more than about 70% by weight, in another embodiment no more than about 50% by weight, and in yet another embodiment no more than about 20% by weight, although the amount can be outside of these ranges.

The polymer solution is heated to any desired or effective temperature, in one embodiment at least about 30° C., in another embodiment at least about 40° C., and in yet another embodiment at least about 50° C., and in one embodiment no more than about 150° C., in another embodiment no more than about 100° C., and in yet another embodiment no more than about 75° C., although the temperature can be outside of these ranges.

The metal is added to the polymer in any desired or effective amount, in one embodiment at least about 0.1 mole of metal per mole of maleic anhydride/acid moiety present in the maleic anhydride or acid containing copolymer, in another embodiment at least about 0.2 mole of metal per mole of maleic anhydride/acid moiety present in the maleic anhydride or acid containing copolymer, and in yet another embodiment at least about 0.9 mole of metal per mole of maleic anhydride/acid moiety present in the maleic anhydride or acid containing copolymer, and in one embodiment no more than about 2.0 moles of metal per mole of maleic anhydride/acid moiety present in the maleic anhydride or acid containing copolymer, in another embodiment no more than about 1.5 moles of metal per mole of maleic anhydride/acid moiety present in the maleic anhydride or acid containing copolymer, and in yet another embodiment no more than about 1.0 mole of metal per mole of maleic anhydride/acid moiety present in the maleic anhydride or acid containing copolymer, although the amount can be outside of these ranges.

Examples of suitable solvents for the metal include water, methanol, ethanol, acetonitrile, or the like, as well as mixtures thereof. The metal is present in the solvent in any desired or effective amount, in one embodiment at least about 1% by weight, in another embodiment at least about 3% by weight, and in yet another embodiment at least about 5% by weight, and in one embodiment no more than about 70% by weight, in another embodiment no more than about 50% by weight, and in yet another embodiment no more than about 20% by weight, although the amount can be outside of these ranges.

The chromogen molecule is added to the mixture in any desired or effective amount, in one embodiment at least about 0.1 mole of chromogen molecule per every mole of metal, in another embodiment at least about 0.2 mole of chromogen molecule per every mole of metal, and in yet another embodiment at least about 0.5 mole of chromogen molecule per every mole of metal, and in one embodiment no more than about 1 mole of chromogen molecule per every mole of metal, in another embodiment no more than about 0.8 mole of chromogen molecule per every mole of metal, and in yet another embodiment no more than about 0.6 mole of chromogen molecule per every mole of metal, although the amount can be outside of these ranges.

Examples of suitable solvents for the dye include water, acetone, acetonitrile, ethanol, N-methylpyrrolidinone, dimethylformamide, dimethylsulfoxide, or the like, as well as mixtures thereof. The dye is present in the solvent in any desired or effective amount, in one embodiment at least about 1% by weight, in another embodiment at least about 3% by weight, and in yet another embodiment at least about 5% by weight, and in one embodiment no more than about 70% by weight, in another embodiment no more than about 50% by weight, and in yet another embodiment no more than about 20% by weight, although the amount can be outside of these ranges.

The reaction between the polymer, the metal, and the dye, which is the laking process, can take place for any desired or effective period of time, in one embodiment at least about 5 minutes, in another embodiment at least about 30 minutes, and in yet another embodiment at least about 1 hour, and in one embodiment no more than about 4 days, in another embodiment no more than about 3 days, and in yet another embodiment no more than about 2 days, although the period of time can be outside of these ranges.

In some embodiments, the colorants thus prepared are often obtained as small particles with no necessity for further particle size reduction by use of a ball mill, homogenizer, grinder, rotor-stator blade, or other mechanical means. Particle sizes obtained can be in one embodiment at least about 0.05 µm, in another embodiment at least about 0.1 µm, and in yet another embodiment at least about 0.2 µm, and in one embodiment no more than about 1 µm, in another embodiment no more than about 0.7 µm, and in yet another embodiment no more than about 0.5 µm, although the particle size can be outside of these ranges. Particle size here is reported in terms of volume average diameter (also referred to as "volume average particle diameter" or "$D_{50v}$") as measured using a measuring instrument such as a Malvern Zetasizer Nano HT, operated in accordance with the manufacturer's instructions. Representative sampling can occur as follows: a small amount of sample, about 1 g, can be obtained and filtered through a 0.2 µm screen, then put in isotonic solution to obtain a concentration of about 100 ppm by mass, with the sample then run in a Malvern Zetasizer Nano HT.

Phase change inks as disclosed herein contain a phase change carrier system or composition. The phase change carrier composition is typically designed for use in either a direct printing mode or an indirect or offset printing transfer system. The term "carrier" as used herein generally refers to components of the ink other than the colorant.

In the direct printing mode, the phase change carrier composition in one embodiment contains one or more materials that enable the phase change ink (1) to be applied in a thin film of uniform thickness on the final recording substrate (such as paper, transparency material, or the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

Any desired or effective carrier composition can be used. Examples of suitable ink carrier materials include fatty amides, such as monoamides, triamides, tetra-amides, mixtures thereof, or the like, as well as mixtures thereof. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, or the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

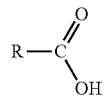

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference. Also suitable are branched triamides as disclosed in U.S. Pat. No. 6,860,930, the disclosure of which is totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, or the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Mixtures of fatty amide materials and isocyanate-derived materials can also be employed as the ink carrier composition.

Additional suitable phase change ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, or the like, ionomers, or the like, as well as mixtures thereof. One or more of these materials can also be employed in a mixture with a fatty amide material and/or an isocyanate-derived material.

Specific examples of suitable waxes include polyethylene waxes such as PE 500 and PE 655, available from Baker Petrolite, Tulsa, Okla., Fischer-Tropsch waxes, available from Sasol Wax Americas, Inc., Shelton, Conn., waxes as disclosed in, for example, Copending application Ser. No. 11/126,745 and U.S. Patent Publication 2005/0130054, the disclosures of which are totally incorporated herein by reference, and waxes as disclosed in Copending application Ser. Nos. 11/290,221, 11/291,055, 11/290,263, 11/290,222, and 11/290,265, filed Nov. 30, 2005, the disclosures of each of which are totally incorporated herein by reference.

In one specific embodiment, the phase change ink carrier comprises (a) a polyethylene wax, present in the ink in an amount in one embodiment of at least about 25 percent by weight of the ink, in another embodiment of at least about 30 percent by weight of the ink, and in yet another embodiment of at least about 37 percent by weight of the ink, and in one embodiment of no more than about 80 percent by weight of the ink, in another embodiment of no more than about 70 percent by weight of the ink, and in yet another embodiment of no more than about 60 percent by weight of the ink, although the amount can be outside of these ranges; (b) a stearyl stearamide wax, present in the ink in an amount in one embodiment of at least about 3 percent by weight of the ink, in another embodiment of at least about 5 percent by weight of the ink, and in yet another embodiment of at least about 8 percent by weight of the ink, and in one embodiment of no more than about 32 percent by weight of the ink, in another embodiment of no more than about 28 percent by weight of the ink, and in yet another embodiment of no more than about 25 percent by weight of the ink, although the amount can be outside of these ranges; (c) a dimer acid based tetra-amide that is the reaction product of dimer acid, ethylene diamine, and a long chain hydrocarbon having greater than thirty six carbon atoms and having a terminal carboxylic acid group, present in the ink in an amount in one embodiment of at least about 5 percent by weight of the ink, in another embodiment of at least about 8 percent by weight of the ink, and in yet another embodiment of at least about 10 percent by weight of the ink, and in one embodiment of no more than about 32 percent by weight of the ink, in another embodiment of no more than about 27 percent by weight of the ink, and in yet another embodiment of no more than about 22 percent by weight of the ink, although the amount can be outside of these ranges; (d) a urethane resin derived from the reaction of two equivalents of hydroabietyl alcohol and one equivalent of isophorone diisocyanate, present in the ink in an amount in one embodiment of at least about 6 percent by weight of the ink, in another embodiment of at least about 8 percent by weight of the ink, and in yet another embodiment of at least about 10 percent by weight of the ink, and in one embodiment of no more than about 16 percent by weight of the ink, in another embodiment of no more than about 14 percent by weight of the ink, and in yet another embodiment of no more than about 12 percent by weight of the ink, although the amount can be outside of these ranges; (e) a urethane resin that is the adduct of three equivalents of stearyl isocyanate and a glycerol-based propoxylate alcohol, present in the ink in an amount in one embodiment of at least about 2 percent by weight of the ink, in another embodiment of at least about 3 percent by weight of the ink, and in yet another embodiment of at least about 4.5 percent by weight of the ink, and in one embodiment of no more than about 13 percent by weight of the ink, in another embodiment of no more than about 10 percent by weight of the ink, and in yet another embodiment of no more than about 7.5 percent by weight of the ink, although the amount can be outside of these ranges; and (f) an antioxidant, present in the ink in an amount in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 1 percent by weight of the ink, in another embodiment of no more than about 0.5 percent by weight of the ink, and in yet another embodiment of no more than about 0.3 percent by weight of the ink, although the amount can be outside of these ranges.

In another specific embodiment, the phase change ink carrier comprises (a) a polyethylene wax, (b) a stearyl stearamide wax, (c) a branched triamide of the formula

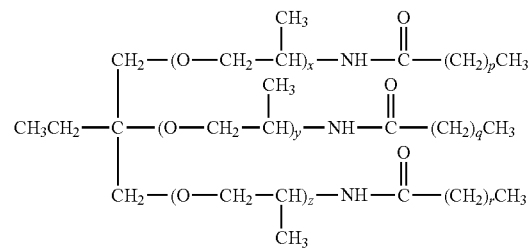

wherein x, y, and z each independently represent the number of propyleneoxy repeat units and x+y+z is from about 5 to about 6, and wherein p, q, and r each, independently of the others, are integers representing the number of repeat —(CH$_2$)— units, wherein p, q, and r have an average value of from about 35, (d) a urethane resin that is the adduct of three equivalents of stearyl isocyanate and a glycerol-based alcohol, and (e) a triglyceride of hydrogenated abietic acid.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The inks also contain the colorants described hereinabove, comprising the colored laked complex. The colorant is present in the ink in any desired or effective amount, in one embodiment at least about 0.05% by weight, in another embodiment at least about 0.1% by weight, and in yet another embodiment at least about 0.5% by weight, and in one embodiment no more than about 50% by weight, in another embodiment no more than about 10% by weight, and in yet another embodiment no more than about 5% by weight, although the amount can be outside of these ranges.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512 (commercially available from Uniroyal Chemical Company, Oxford, Conn.), IRGANOX® 1010 (commercially available from Ciba Geigy), or the like, as well as mixtures thereof. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), or the like, as well as mixtures thereof, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these ranges, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), or the like, as well as mixtures thereof, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, or the like, as well as mixtures thereof.

The ink compositions in one embodiment have melting points of no lower than about 50° C., in another embodiment of no lower than about 70° C., and in yet another embodiment of no lower than about 80° C., and have melting points in one embodiment of no higher than about 160° C., in another embodiment of no higher than about 140° C., and in yet another embodiment of no higher than about 100° C., although the melting point can be outside of these ranges.

The ink compositions generally have melt viscosities at the jetting temperature (in one embodiment no lower than about 75° C., in another embodiment no lower than about 100° C., and in yet another embodiment no lower than about 120° C., and in one embodiment no higher than about 180° C., and in another embodiment no higher than about 150° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges. In another specific embodiment, the inks have viscosities of from about 7 to about 15 centipoise at temperatures of about 110, 115, and/or 120° C.

The ink compositions can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, or the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, or the like, transparency materials, fabrics, textile products, plastics, polymeric films, inorganic substrates such as metals and wood, or the like.

Specific embodiments will now be described in detail. These examples are intended to be illustrative, and the claims are not limited to the materials, conditions, or process parameters set forth in these embodiments. All parts and percentages are by weight unless otherwise indicated.

Example I

Part A: Dye Preparation

1. Acid Soup Preparation

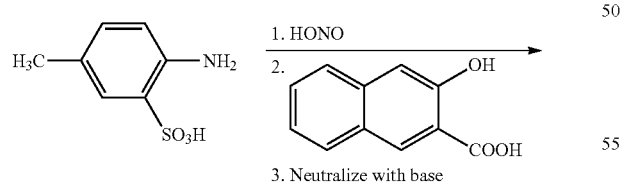

-continued

Into a 200 mL beaker with magnetic stir was charged 11.2 g 4-aminotoluene sulfonic acid, 120 g deionized water, and 13.4 g concentrated (about 29% by weight) $NH_4OH$. The resulting mixture was stirred to dissolve the contents and was then was put in an ice bath. When it cooled down to 0° C., 18 mL of 23% sodium nitrite was added. Thereafter, into a 500 mL 3-neck round-bottomed flask equipped with magnetic stir and ice bath was charged 16.3 g concentrated HCl and 110 g ice/water. With stirring the aminotoluene sulfonic acid solution was slowly added to the HCl solution in the round-bottomed flask. Temperature was kept under 0° C. The contents were stirred below 0° C. for about 2 h, after which the mixture turned Starch-I paper black, indicating that a diazonium salt solution had formed and was ready to couple.

The coupler solution was then prepared by adding into a 1 L beaker with magnetic stir 12.3 g 3-hydroxy-2-naphthonic acid, 400 mL deionized water, and 30 g concentrated (29%) $NH_4OH$ or 14 g $Na_2CO_3$. The contents dissolved and was ready to couple.

With stirring, the diazonuim salt solution was slowly poured into the coupler solution. The color turned to red immediately. The contents were thick and the filtration was slow. About 1 L water was added to the reaction product and it was transferred to and stored in two 1 L jars. The aforementioned reaction product represents about 23.3 g of "actual" product (Pigment Red 57) in about 1.5 L of an aqueous/salt solution. Subsequent laking of dye to polymer (i.e., the stoichiometry/calculations) were based on 23.3 grams of actual dye.

Part B: Complex Preparation

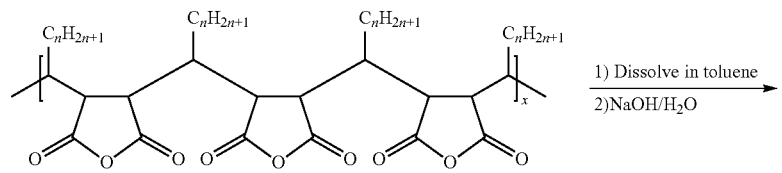

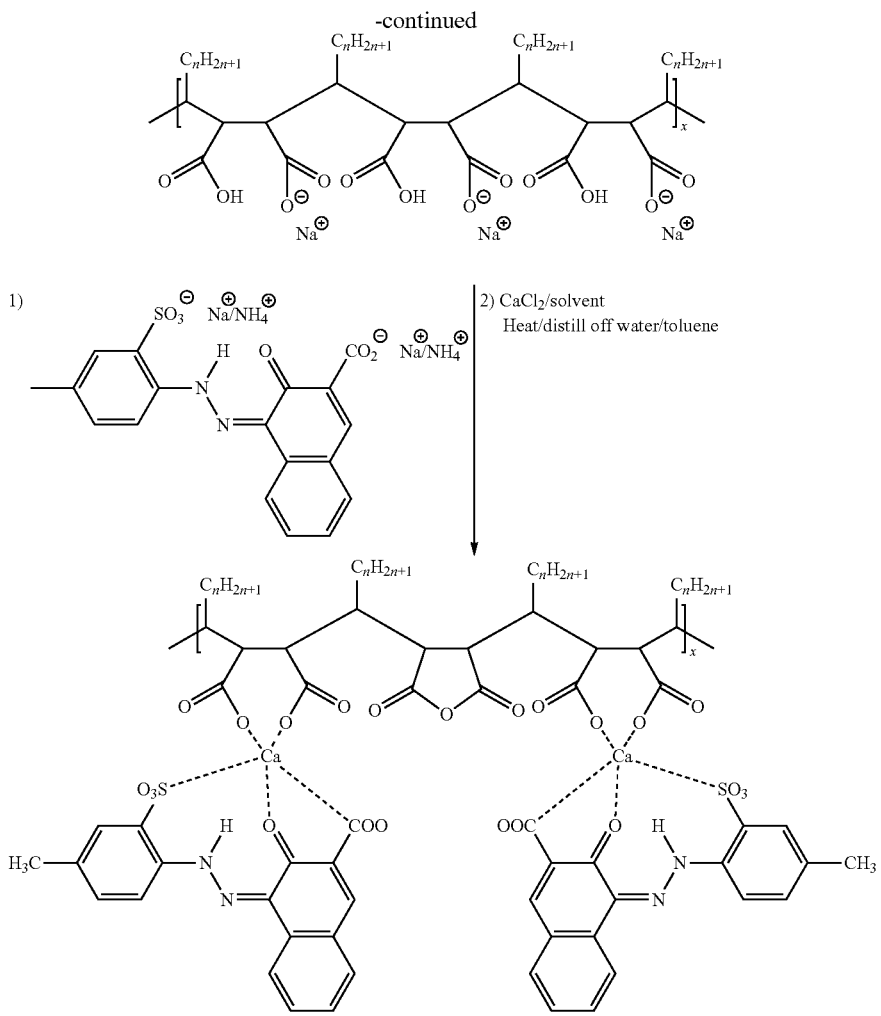

To a 2 L 3-necked round-bottom flask equipped with mechanical stirrer and condenser was charged ~450 g toluene and 42 g of (1) alpha olefin-maleic anhydride copolymer (X-5400, obtained from Baker-Petrolite Corp, Tulsa, Okla., MW=7000), of the formula

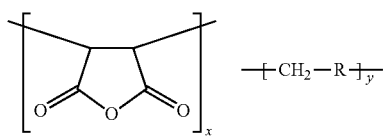

wherein x and y each have an average value of about 13 and R is $-CH[(CH_2)_m CH_3]-$ wherein m is 27, or (2) a capped poly(12-hydroxystearic acid) prepared in as described in *Ind Eng Chem Res Dev* 1986 vol 25 p. 4539, the disclosure of which is totally incorporated herein by reference, or (3) a poly(ethylene-co-acrylic acid) 15% acrylic acid polymer obtained from Aldrich Chemical Co. The flask was place in an oil bath and heated to reflux (~135° C.). After the contents had dissolved, a solution containing 3.1 g or 6.2 g NaOH and 15 g $H_2O$ was added and stirred for ~2 h. Thereafter, about one-third of a solution containing 6.7 g $CaCl_2$ or 16.1 g $SrCl_2$ and 15 g $H_2O$ was added and the reaction mixture was stirred for an additional 10 minutes, followed by addition of the azo dye prepared in Part A (theoretic yield is 23.1 g, 5 or 10 moles ratio to X-5400) and the second third of the $CaCl_2$ or $SrCl_2$ solution. After stirring for an additional 20 minutes the final third of the $CaCl_2$ or $SrCl_2$ solution was added. Solvent was then distilled off by blowing $N_2$ gently into the system. More toluene was added as needed to azeotrope off the water. When the contents were nearly dry, 400 g of polyethylene wax (POLYWAX 500, obtained from Baker Petrolite), S-180 (stearylstearamide), or a hot melt ink vehicle formulation as disclosed in Example XIII of U.S. Pat. No. 7,442,242, the disclosure of which is totally incorporated herein by reference, without the orange and black dyes added, was added gradually to ensure smooth stirring. The contents were then poured into aluminum pans. A 50 gram sample was poured into a 4 oz jar and placed in a 125° C. oven for 14 days.

Part C: Stability Evaluation

The relative amounts of X-5400, dye, NaOH, and diluents were varied to determine the conditions under which stable sub-micron pigment dispersions could be produced with the pigments of Example I.

Heat and aging stability were tested on a 60 g sample placed in an 8 oz jar in an oven after 14 days at 125° C. The results are shown below. "Stable" indicates that no separation of the colorless POLYWAX 500 from the laked dye was observed; "unstable" indicates that separation was observed.

| # | dispersant; #moles; amt. (g) | moles NaOH/g added to dispersant | moles MCl$_2$/g added to dispersant and dye | moles (equiv) dye added to dispersant (23.1 g PR 57) | diluent (~400 g) | heat/ aging stability |
|---|---|---|---|---|---|---|
| 1 | X-5400 1 mol; 42 g | 13 mol; 3.12 g | CaCl$_2$ 10 mol; 6.7 g | 10 mol (Na salt) | PW-500 | stable |
| 2 | X-5400 1 mol; 42 g | 13 mol; 3.12 g | CaCl$_2$ 5 mol; 3.3 g | 5 mol (Na salt) | PW-500 | stable |
| 3 | X-5400 1 mol; 42 g | 13 mol; 3.12 g | CaCl$_2$ 10 mol; 6.7 g | 10 mol (NH$_4^+$ salt) | PW-500 | stable |
| 4 | X-5400 1 mol; 42 g | 13 mol; 3.12 g | CaCl$_2$ 5 mol; 3.3 g | 5 mol (NH$_4^+$ salt) | PW-500 | stable |
| 5 | X-5400 1 mol; 42 g | 13 mol; 3.12 g | CaCl$_2$ 10 mol; 6.7 g | 10 mol (NH$_4^+$ salt) adjust dye to pH = 2 | PW-500 | stable |
| 6 | X-5400 1 mol; 42 g | 13 mol; 3.12 g | CaCl$_2$ 10 mol; 6.7 g | 10 mol (NH$_4^+$ salt) | S180 | stable |
| 7 | X-5400 1 mol; 42 g | 13 mol; 3.12 g | CaCl$_2$ 5 mol; 3.3 g | 5 mol (NH$_4^+$ salt) | S180 | stable |
| 8 | X-5400 1 mol; 42 g | 13 mol; 3.12 g | CaCl$_2$ 10 mol; 6.7 g | 10 mol (NH$_4^+$ salt) | ink | stable |
| 9 | poly12HSA 1 mol; 16.9 g | 0 | CaCl$_2$ 1 mol; 6.7 g | 5 mol (NH$_4^+$ salt) | PW-500 | unstable |
| 10 | polyethylene co- acrylic acid) 15% acrylic acid 1 mol; 5.26 g | 0 | CaCl$_2$ 1 mol; 6.7 g | 5 mol (NH$_4^+$ salt) | PW-500 | unstable |
| 11 | X-5400 1 mol; 42 g | 0 | SrCl$_2$ 10 mol; 16.1 g | 10 mol (Na salt) | PW-500 | stable |
| 12 | X-5400 1 mol; 42 g | 0 | SrCl$_2$ 5 mol; 8.05 g | 5 mol (Na salt) | PW-500 | stable |

The solvent used for further dilution for particle size analysis is indicated in the table below. One part of the solvent in the first column of the table was used to dilute the actual sample before measurement in the particle size analyzer except where noted. Aging was carried out for 1 to 2 days at 110° C. on a 1 g sample. Dynamic Light Scattering (DLS) testing was carried out with a Malvern Zetasize Nano ZS HT and PDI, a measure of dispersion as described in ASTM E2490-09, was calculated. The closer the PDI is to zero the narrower the particle size distribution. Visual results of the particle size analysis are also indicated in the table. Sample A was a control comprising raw (unmilled) Pigment 57:1 as obtained directly from Clariant diluted in S180. Sample B was a control comprising Pigment 57:1 obtained from Clariant and ball milled for 7 days at ~120° C. in S180 and then incorporated into an ink as described in Example XIII of U.S. Pat. No. 7,442,242. Particle sizes are reported in nanometers.

| # | solvent | size before aging | PDI before aging | size after aging | PDI after aging | visual observations |
|---|---|---|---|---|---|---|
| 1 | S180 | 169 | 0.18 | 221 | 0.28 | reasonably stable |
|   | PW-500 | 151 | 0.40 | 384 | 0.77 | unstable; poor compatibility |
| 2 | S180 | 210 | 0.27 | 570 | 0.48 | poor stability |
|   | PW-500 | 264 | 0.44 | 615 | 0.74 | poor stability |
| 2b* | S180 | 178 | 0.16 | 203 | 0.49 | poor stability |
|   | PW-500 | 222 | 0.10 | 248 | 0.43 | unstable |
| 3** | S180 | 405 | 0.49 | 460 | 0.50 | reasonably stable |
|   | PW-500 | 449 | 0.29 | — | — | poor size distribution; did not proceed w/ aging |
| 4 | S180 | 505 | 0.38 | 474 | 0.34 | reasonably stable; good color strength |
|   | PW-500 | 543 | 0.49 | 413 | 0.19 | reasonably stable; good color strength |
| 5 | S180 | 1923 | 0.78 | — | — | poor size distribution; did not proceed w/ aging |
|   | PW-500 | — | — | — | — | very aggregated; could not register measurement |
| 6 | S180 | 782 | 0.64 | — | — | poor size distribution; did not proceed w/ aging |
|   | PW-500 | 650 | 0.50 | 608 | 0.40 | reasonably stable; good color strength |
| 7 | — | — | — | — | — | — |
| 8 | S180 | 564 | 0.37 | 639 | 0.64 | poor stability |
|   | PW-500 | 666 | 0.42 | 562 | 0.16 | — |
| 9 | S180 | 1458 | 0.63 | — | — | — |
|   | PW-500 | 7594 | 0.58 | — | — | — |
| 10 | — | — | — | — | — | — |

-continued

| # | solvent | size before aging | PDI before aging | size after aging | PDI after aging | visual observations |
|---|---------|-------------------|------------------|------------------|-----------------|---------------------|
| 11 | — | — | — | — | — | — |
| 12 | — | — | — | — | — | — |
| A | — | — | — | — | — | most of powder is "macroscopic" |
| B | ink | 127 | 0.211 | — | — | very stable |

— = not measured
*diluted with 5 parts solvent to 1 part sample
**diluted with 10 parts solvent to 1 part sample Example II

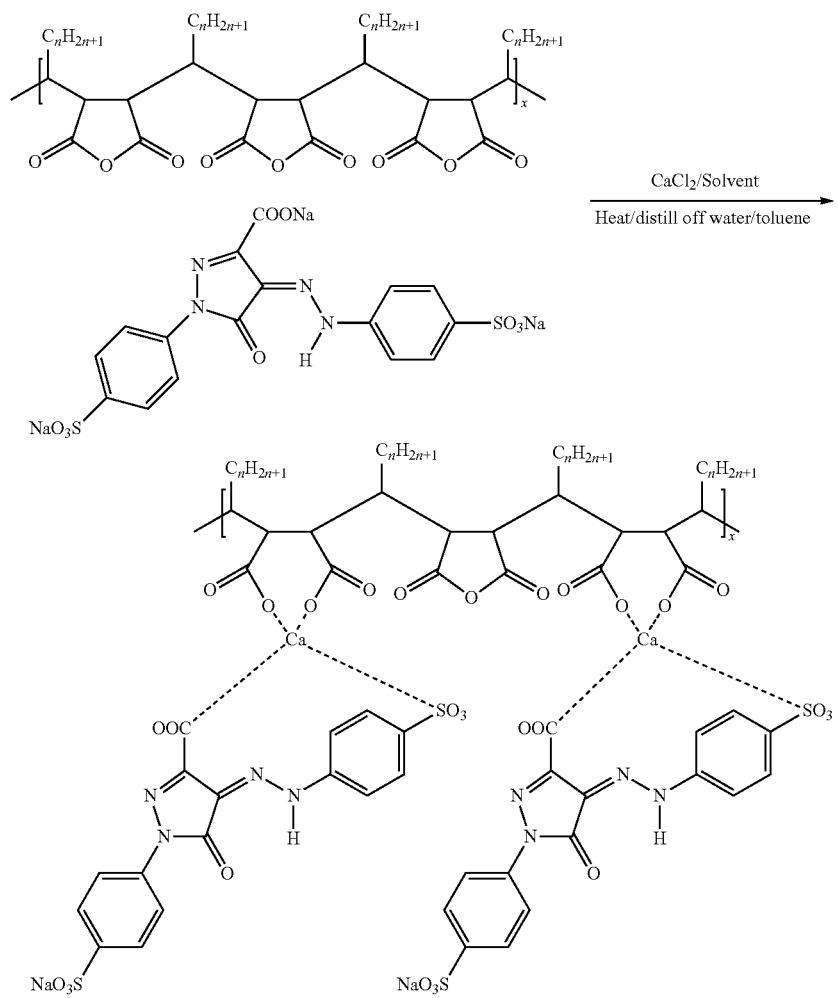

To a 2 L 3-necked round bottom flask equipped with mechanical stirrer and condenser was charged 83.8 g alpha olefin-maleic anhydride copolymer (X-5400, obtained from Baker-Petrolite Corp, MW=7000) and ~450 g toluene. The flask was place in an oil bath and heated to reflux (~135° C.). After the contents had dissolved, a solution containing 6.2 g NaOH and 15 g $H_2O$ was added and stirred for ~2 h. Thereafter, about one-third of a solution containing 6.7 g $CaCl_2$ and 15 g $H_2O$ was added and stirred for an additional 10 minutes, followed by addition of a solution containing 32 g Acid Yellow 23 dye (obtained from Aldrich Chemical Co., Milwaukee, Wis.) in 250 mL water and the second third of the $CaCl_2$ solution. After stirring for an additional 20 minutes the final third of the $CaCl_2$ solution was added. Solvent was then distilled off by blowing $N_2$ gently into the system. More toluene was added as needed to azeotrope off the water. When the contents were nearly dry, 400 g of polyethylene wax (POLYWAX 500, obtained from Baker Petrolite) was added gradually to ensure smooth stirring. The contents were then poured into aluminum pans. A 50 gram sample was poured into a 4 oz jar and placed in a 128° C. oven for 7 days, after which no phase separation of the clear POLYWAX 500 from the colored dispersed pigment was observed.

Example III

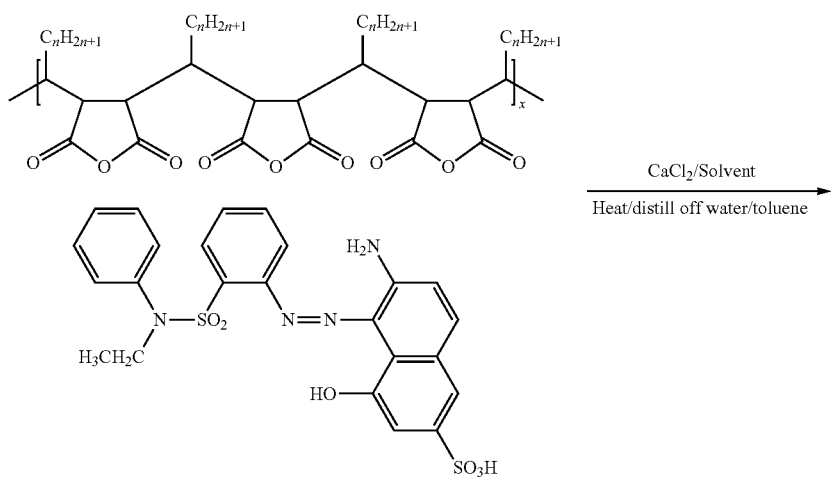

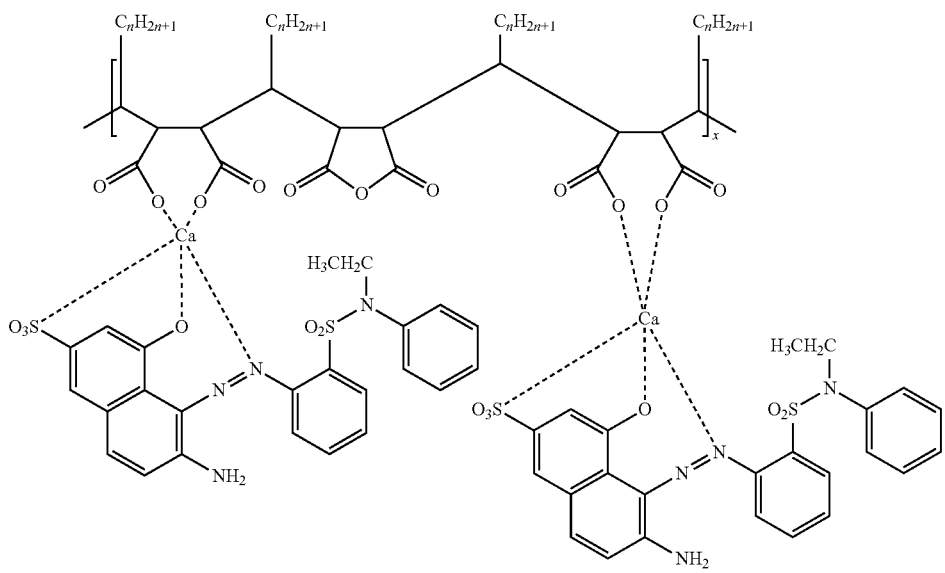

To a 2 L 3-necked round-bottom flask equipped with mechanical stirrer and condenser was charged 42 g alpha olefin-maleic anhydride copolymer (X-5400, obtained from Baker-Petrolite Corp, MW=7000) and ~450 g toluene. The flask was placed in an oil bath and heated to reflux (~135° C.). After the contents had dissolved, a solution containing 3.1 g NaOH and 8 g $H_2O$ was added and stirred for ~2 h. Thereafter, about one-third of a solution containing 3.3 g $CaCl_2$ and 15 g $H_2O$ was added and stirred for an additional 10 minutes, followed by addition of a solution containing 15.3 g Acid Red 57 dye (obtained from Crompton and Knowles Corp) in a 250 mL water and acetone mixture containing about 10% acetone and the second third of the $CaCl_2$ solution. After stirring for an additional 20 minutes the final third of the $CaCl_2$ solution was added. Solvent was then distilled off by blowing $N_2$ gently into the system. More toluene was added as needed to azeotrope off the water. When the contents were nearly dry, 400 g of polyethylene wax (POLYWAX 500, obtained from Baker Petrolite) was added gradually to ensure smooth stirring. The contents were then poured into aluminum pans. A 50 gram sample was poured into a 4 oz jar and placed in a 128° C. oven for 7 days, after which no phase separation of the clear POLYWAX 500 from the colored dispersed pigment was observed.

Example IV

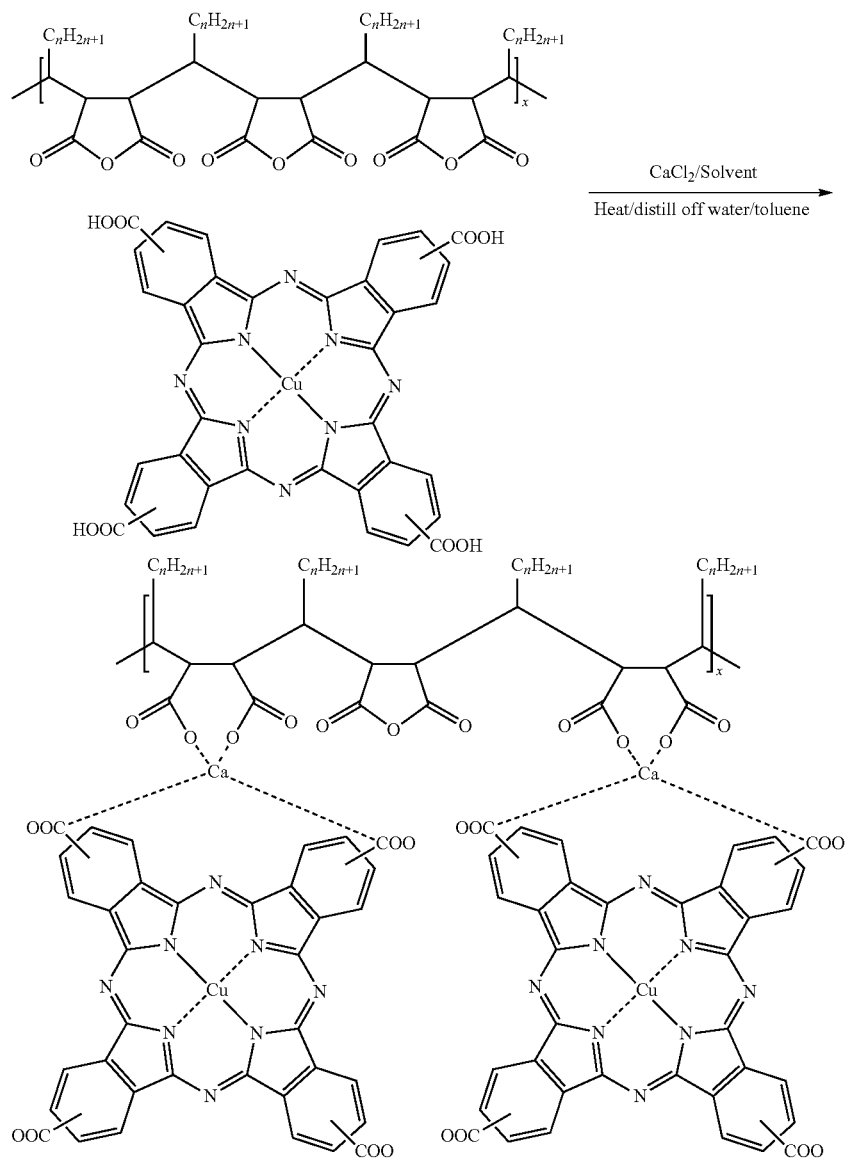

To a 2 L 3-necked round-bottom flask equipped with mechanical stirrer and condenser was charged 42 g alpha olefin-maleic anhydride copolymer (X-5400, obtained from Baker-Petrolite Corp, MW=7000) and ~450 g toluene. The flask was placed in a heated oil bath at 135° C. After the contents had dissolved, a solution containing 6.2 g NaOH and 8 g $H_2O$ was added and stirred for ~2 h. Thereafter, about one-third of a solution containing 3.3 g $CaCl_2$ and 8 g $H_2O$ was added and stirred for an additional 10 minutes, followed by addition of 11.5 grams of copper phthalocyanine tetracarboxylic acid (prepared by an adaptation of the method described in British Patent 464,126, the disclosure of which is totally incorporated herein by reference) in 250 mL water containing $NH_3$ to dissolve the dye followed by the second third of the $CaCl_2$ solution. After stirring for an additional 20 minutes the final third of the $CaCl_2$ solution was added. Solvent was then distilled off by blowing $N_2$ gently into the system. More toluene was added as needed to azeotrope off the water. When the contents were nearly dry, 400 g polyethylene wax (POLYWAX 500, obtained from Baker Petrolite) was added gradually to ensure smooth stirring. The contents were poured into aluminum pans. A 50 gram sample was poured into a 4 oz jar and placed in a 128° C. oven for 10 days, after which no phase separation of the clear POLYWAX 500 from the colored dispersed pigment was observed.

Example V

The processes of Examples I through IV are repeated except that the X-5400 alpha olefin-maleic anhydride copolymer is replaced with equimolar amounts of Q-0048 alpha olefin-maleic anhydride copolymer, of the same formula but wherein m is 11 and x and y each have an average value of about 25. It is believed that similar results will be obtained.

Example VI

The processes of Examples I through IV are repeated except that the X-5400 alpha olefin-maleic anhydride copolymer is replaced with equimolar amounts of X-5399 alpha olefin-maleic anhydride copolymer, of the same formula but wherein m is an integer of from about 21 to about 25 and x and y each have an average value of about 10. It is believed that similar results will be obtained.

Example VII

The processes of Examples I through IV are repeated except that the X-5400 alpha olefin-maleic anhydride copolymer is replaced with equimolar amounts of SMA 3000-styrene-maleic anhydride copolymer, available from Atochem Inc., Malvern, Pa., of the formula

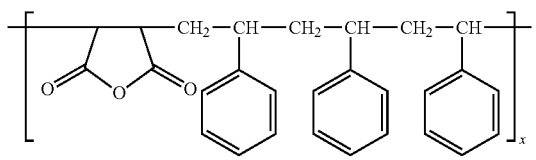

wherein x had an average value of about 4.63 and Mw was about 1900. It is believed that similar results will be obtained.

Example VIII

The processes of Examples I through IV are repeated except that the X-5400 alpha olefin-maleic anhydride copolymer is replaced with equimolar amounts of poly(acrylic acid-co-maleic acid) available from Aldrich Chemical Corp., having an average Mw of about 3,000. It is believed that similar results will be obtained.

Example IX

Print Testing

The colorant samples diluted in POLYWAX 500, S180, or the ink vehicle from Example XIII of U.S. Pat. No. 7,442,242 as prepared in Example IC were used for print testing. Using an RK Print-Coat Instruments Ltd. K-proofer, print samples of the inks were produced on HAMMERMILL LASERPRINT paper. These proofs showed three different intensities of ink coverage on the paper.

Example X

Ink compositions are prepared as described in Example I of U.S. Pat. No. 7,347,892, the disclosure of which is totally incorporated herein by reference, except that the colorants prepared in Examples I through VIII are substituted for the surface modified carbon black pigment disclosed therein. More specifically, 5 g of the dried pigment particles are added to 38.7 g polyethylene wax (POLYWAX 655, available from Baker Petrolite), 21.6 g stearyl stearamide (KEMAMIDE S-180, available from Witco, Humko Chemical Division, Memphis, Tenn.), 15.9 g of a tetra-amide resin obtained from the reaction of one equivalent of a C-36 dimer acid available from Uniqema, New Castle, Del. with two equivalents of ethylene diamine and UNICID 700 (available from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference, 11.8 g of a urethane resin obtained from the reaction of two equivalents of ABITOL E hydroabietyl alcohol (available from Hercules Inc., Wilmington, Del.) and one equivalent of isophorone diisocyanate, prepared as described in Example 1 of U.S. Pat. No. 5,782,966, the disclosure of which is totally incorporated herein by reference, 5.0 g of a urethane resin that was the adduct of three equivalents of stearyl isocyanate and a glycerol-based alcohol, prepared as described in Example 4 of U.S. Pat. No. 6,309,453, the disclosure of which is totally incorporated herein by reference, and 2.0 g of NAUGARD N445 antioxidant (available from Uniroyal Chemical Co., Middlebury, Conn.). The molten mixture is mixed for 1 h at 140° C. The ink is filtered through successively finer filters of which the last is 0.45 μm.

Example XI

Inks are prepared as described in Examples 7 and 8 of U.S. Pat. No. 7,427,323, the disclosure of which is totally incorporated herein by reference except that the colorants prepared in Examples I through VIII are substituted for the nanopigments disclosed therein. Into a Szegvari 01 attritor available from Union Process are charged 1800.0 g ⅛ inch diameter 440 C Grade 25 steel balls available from Hoover Precision Products, Inc. The following components are added together and melt-mixed at 120° C. in a 600 mL beaker: 114.8 g distilled polyethylene wax from Baker Petrolite, 11.1 g of a triamide wax (described in U.S. Pat. No. 6,860,930), 22.3 g KE-100 resin available from Arakawa Corporation, 0.3 g NAUGARD-445 (antioxidant) available from Crompton Corp., and 8.04 g of OLOA 11000, available from Chevron Corporation, are added to the above solution and stirred to complete dissolution. The resultant solution is quantitatively transferred to the attritor vessel. To the attritor vessel are added 5.39 g of pigment from one of Examples I through VIII. A multi-staged impeller is then attached to the attritor and the speed adjusted to give an impeller tip velocity of about 4.5 cm/s. The pigmented mixture is allowed to attrite overnight for about 19 h, after which the resultant ink concentrate is discharged and separated from the steel balls in its molten state.

The pigmented ink concentrate is diluted in the following manner. 82.8 g of the concentrate is diluted with 57.2 g of a molten and thoroughly mixed solution diluent of the following: 28.4 g distilled Polyethylene Wax from Baker Petrolite, 8.74 g triamide wax (described in U.S. Pat. No. 6,860,930), 8.95 g S-180 (stearyl stearamide) available from Crompton Corporation, 22.3 g KE-100 resin available from Arakawa Corporation, 0.3 g Naugard-445 (antioxidant) available from Crompton Corporation, and 0.62 g OLOA 11000, available from Chevron Corporation. The solution is added to a heated separatory funnel and then added dropwise to 82.8 g of the concentrate while the concentrate is stirring at 400 rpm in an oven. After addition of the diluent to the concentrate, the ink's pigment concentration is 2% by weight. The ink is allowed to remain stirring for 3.5 h.

Example XII

Inks are prepared as described in Example 1 of U.S. Pat. No. 7,780,774, the disclosure of which is totally incorporated herein by reference except that the colorants prepared in Examples I through VIII are substituted for the HOSTAPERM Blue B4G disclosed therein. A Szegvari 01 Attritor equipped with ⅛ inch stainless steel balls is heated to 120° C.

and charged with a pre-melted mixture containing triamide resin (113.4 g), SOLSPERSE 13240 (with the toluene in the SOLSPERSE 13240 removed by vacuum at high temperature) (21.0 g), and NAUGARD 445 (0.25 g). To the stirred mixture is added slowly pigment from one of Examples I through VIII (21.0 g), and then SOLSPERSE 5000 (0.42 g) as the synergist. The mixture is stirred for 16 h at 250 rpm and 120° C. A diluent solution of KE100 (36.0 g), KEMAMIDE S-180 (40.5 g), urethane resin (12.0 g), NAUGARD 445 (0.25 g), and polyethylene wax (156.0 g) is pre-melted at 120° C. The molten diluent solution is then poured slowly into the stirred ink concentrate (55.7 g) and stirred at 120° C. for a further 1 h. The ink is filtered and solidified to form ink sticks.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A colorant comprising a colored laked complex of:
   (a) a chromogen molecule having at least one:
      (i) carboxylic acid group,
      (ii) carboxylate group,
      (iii) sulfonic acid group,
      (iv) sulfonate group, or
      (v) combination thereof, and
   (b) a polymer selected from a maleic anhydride copolymer or oligomer and/or a carboxylic acid-containing oligomer, polymer, and/or copolymer,
said chromogen molecule and said polymer each being complexed to
   (c) a metal.

2. A colorant according to claim 1 wherein the chromogen molecule has at least two carboxylic acid groups, carboxylate groups, sulfonic acid groups, sulfonate groups, or a combination thereof.

3. A colorant according to claim 1 wherein the chromogen molecule is a monoazo compound, a disazo compound, a phthalocyanine compound, a rhodamine compound, an anthraquinone compound, a nitroso compound, a nitro compound, a stilbene compound, a diarylmethane compound, a triarylmethane compound, a xanthene compound, an acridine compound, a quinoline compound, a methine compound, a thiazole compound, an indamine compound, an indophenole compound, an azine compound, an oxazine compound, a thiazine compound, an aminoketone compound, an indigoid compound, or a mixture thereof.

4. A colorant according to claim 1 wherein the chromogen molecule is C.I. Pigment Red 57:1, C.I. Pigment Red 57:2, C.I. Pigment Red 57:3, C.I. Pigment Red 57, C.I. 13020, C.I. 16230, C.I. 16230:2, C.I. 18065, C.I. 17045, C.I. 17101, C.I. 18070, C.I. 18075, C.I. 18134, C.I. 14720, CI 14720:1, C.I. 16185, C.I. 17053, C.I. 20470, C.I. 20170, C.I. 20195, C.I. 19140, CI 19140:1, C.I. 18900, C.I. 18930, C.I. 18640, C.I. 74320, C.I. Acid Red 388, C.I. 61720, or mixtures thereof.

5. A colorant according to claim 1 wherein the chromogen molecule is C.I. Pigment Red 57:1, C.I. Pigment Red 57:2, C.I. Pigment Red 57:3, C.I. Pigment Red 57, C.I. 19140, C.I. 19140:1, C.I. 17053, copper phthalocyanine tetracarboxylic acid, or a mixture thereof.

6. A colorant according to claim 1 wherein the chromogen molecule is

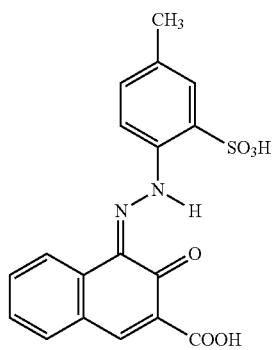 [SMILES: Cc1ccc(N/N=C2\C(=O)C(C(=O)O)=Cc3ccccc32)c(S(=O)(=O)O)c1]

or metal salts thereof,

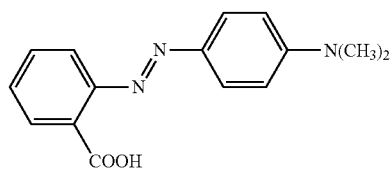 [SMILES: CN(C)c1ccc(/N=N/c2ccccc2C(=O)O)cc1]

or metal salts thereof,

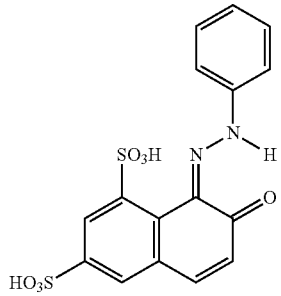 [SMILES: O=C1C=Cc2cc(S(=O)(=O)O)cc(S(=O)(=O)O)c2/C1=N/Nc1ccccc1]

or metal salts thereof,

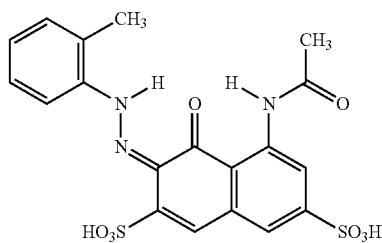 [SMILES: CC(=O)Nc1cc(S(=O)(=O)O)cc2c1C(=O)/C(=N\Nc1ccccc1C)C(S(=O)(=O)O)=C2]

or metal salts thereof,

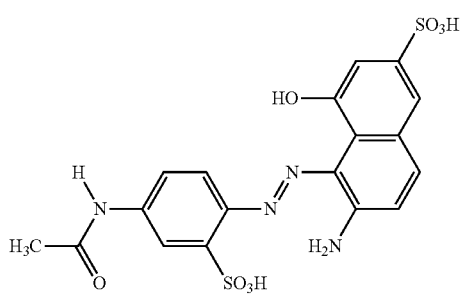 [SMILES: CC(=O)Nc1ccc(/N=N/c2c(N)ccc3cc(S(=O)(=O)O)cc(O)c23)c(S(=O)(=O)O)c1]

or metal salts thereof,
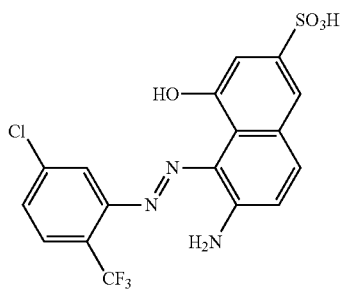 [SMILES: Nc1ccc2cc(S(=O)(=O)O)cc(O)c2c1/N=N/c1cc(Cl)ccc1C(F)(F)F]
or metal salts thereof,
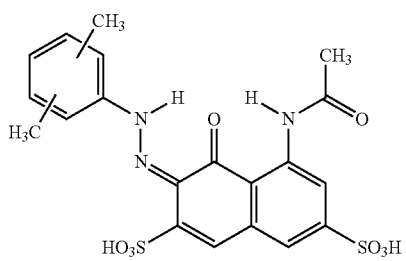
or metal salts thereof,
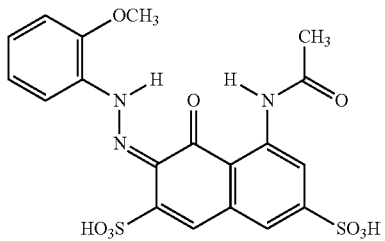 [SMILES: COc1ccccc1N/N=C1\C(=O)c2c(cc(S(=O)(=O)O)cc2NC(C)=O)C=C1S(=O)(=O)O]
or metal salts thereof,
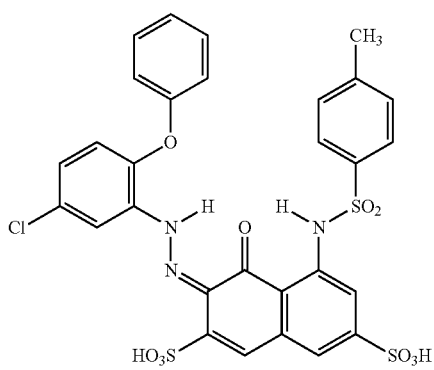 [SMILES: Cc1ccc(S(=O)(=O)Nc2cc(S(=O)(=O)O)cc3c2C(=O)/C(=N\Nc2cc(Cl)ccc2Oc2ccccc2)C(S(=O)(=O)O)=C3)cc1]
or metal salts thereof,
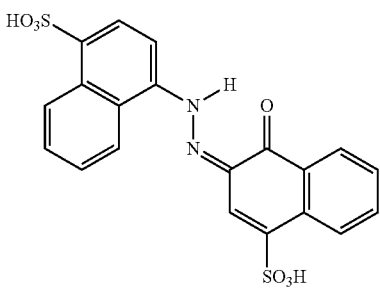 [SMILES: O=C1/C(=N\Nc2ccc(S(=O)(=O)O)c3ccccc23)C=C(S(=O)(=O)O)c2ccccc21]
or metal salts thereof,
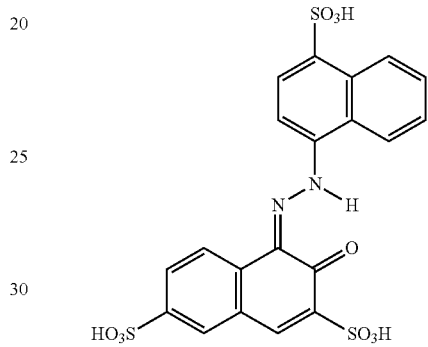
or metal salts thereof,
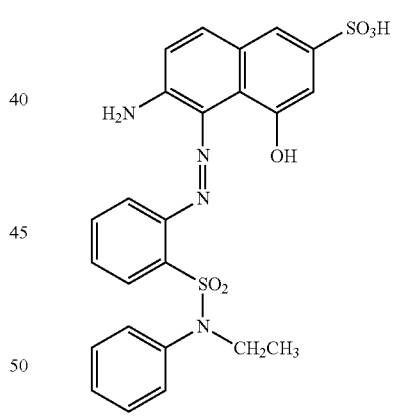
or metal salts thereof,
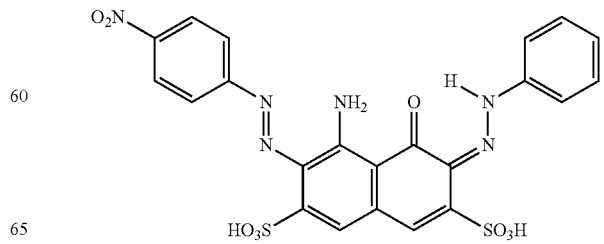

or metal salts thereof,
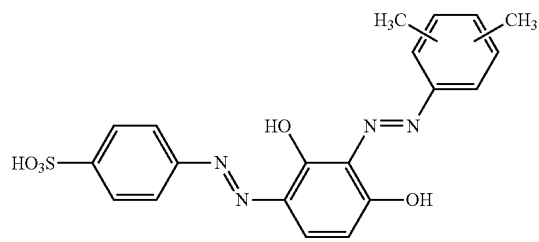
or metal salts thereof,
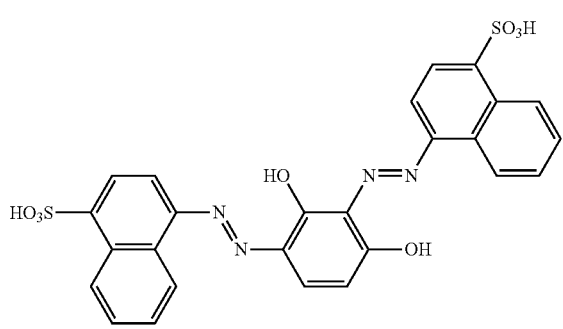 [SMILES: O=S(=O)(O)c1ccc(/N=N/c2ccc(O)c(/N=N/c3ccc(S(=O)(=O)O)c4ccccc34)c2O)c2ccccc12]
or metal salts thereof,
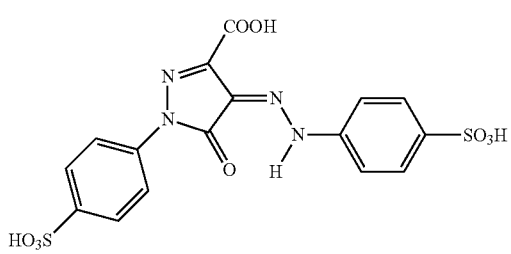 [SMILES: O=C(O)C1=NN(c2ccc(S(=O)(=O)O)cc2)C(=O)/C1=N\Nc1ccc(S(=O)(=O)O)cc1]
or metal salts thereof,
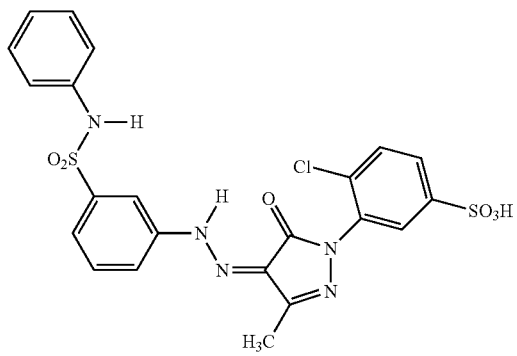 [SMILES: CC1=NN(c2cc(S(=O)(=O)O)ccc2Cl)C(=O)/C1=N\Nc1cccc(S(=O)(=O)Nc2ccccc2)c1]
or metal salts thereof,
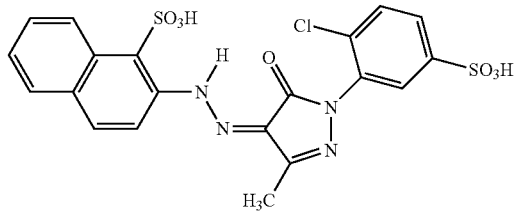 [SMILES: CC1=NN(c2cc(S(=O)(=O)O)ccc2Cl)C(=O)/C1=N\Nc1ccc2ccccc2c1S(=O)(=O)O]
or metal salts thereof,
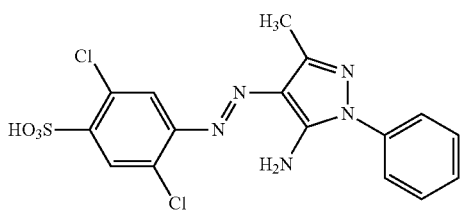 [SMILES: Cc1nn(-c2ccccc2)c(N)c1/N=N/c1cc(Cl)c(S(=O)(=O)O)cc1Cl]
or metal salts thereof,
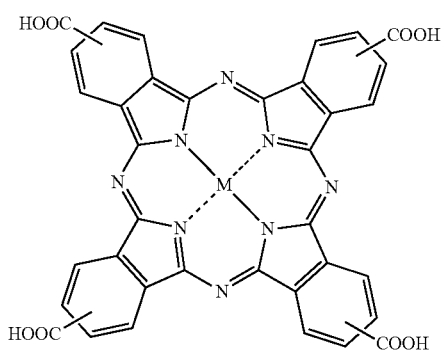
wherein M is $Cu^{2+}$, $Zn^{2+}$, or mixtures thereof, or metal salts thereof,
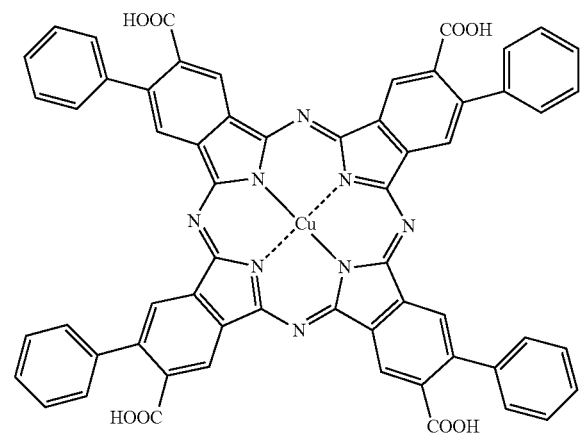

or metal salts thereof,

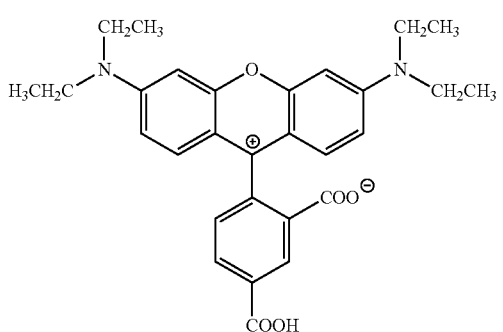

or metal salts thereof,

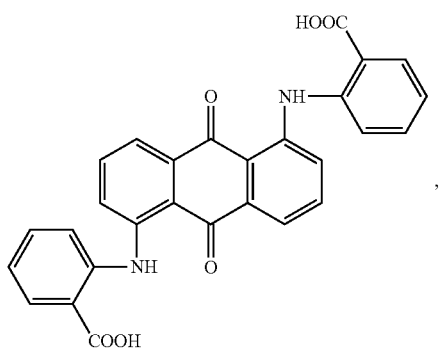 [SMILES: O=C(O)c1ccccc1Nc1cccc2c1C(=O)c1cccc(Nc3ccccc3C(=O)O)c1C2=O]

or metal salts thereof, or a mixture thereof.

7. A colorant according to claim 1 wherein the polymer is of the formula

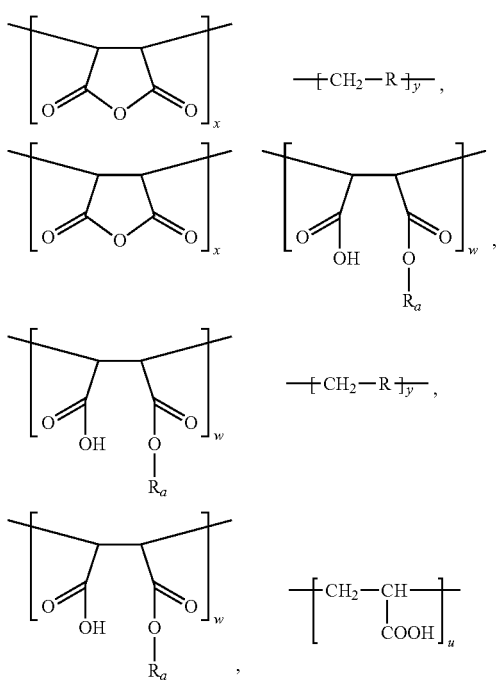

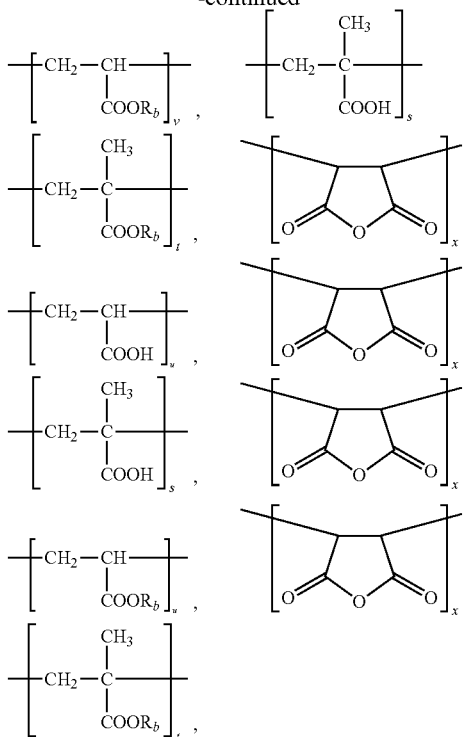

or mixtures thereof; wherein:
- s is an integer representing the number of repeat methacrylic acid units;
- t is an integer representing the number of repeat methacrylic ester units;
- u is an integer representing the number of repeat acrylic acid units;
- v is an integer representing the number of repeat acrylic ester units;
- w is an integer representing the number of repeat maleic half ester units;
- x is an integer representing the number of repeat maleic anhydride units;
- y is an integer representing the number of repeat —$CH_2$—R— units;
- R is:
  - (a) an alkyl group, including substituted and unsubstituted alkyl groups, and wherein hetero atoms either may or may not be present in the alkyl group;
  - (b) an aryl group, including substituted and unsubstituted aryl groups, and wherein hetero atoms either may or may not be present in the aryl group;
  - (c) an arylalkyl group, including substituted and unsubstituted arylalkyl groups, and wherein hetero atoms either may or may not be present in either or both of the alkyl portion and the aryl portion of the arylalkyl group; or
  - (d) an alkylaryl group, including substituted and unsubstituted alkylaryl groups, and wherein hetero atoms either may or may not be present in either or both of the alkyl portion and the aryl portion of the alkylaryl group;
- $R_a$ is:
  - (a) an alkyl group, including substituted and unsubstituted alkyl groups, and wherein hetero atoms either may or may not be present in the alkyl group;

(b) an aryl group, including substituted and unsubstituted aryl groups, and wherein hetero atoms either may or may not be present in the aryl group;

(c) an arylalkyl group, including substituted and unsubstituted arylalkyl groups, and wherein hetero atoms either may or may not be present in either or both of the alkyl portion and the aryl portion of the arylalkyl group; or (d) an alkylaryl group, including substituted and unsubstituted alkylaryl groups, and wherein hetero atoms either may or may not be present in either or both of the alkyl portion and the aryl portion of the alkylaryl group; and $R_b$ is:
  (a) an alkyl group, including substituted and unsubstituted alkyl groups, and wherein hetero atoms either may or may not be present in the alkyl group;
  (b) an aryl group, including substituted and unsubstituted aryl groups, and wherein hetero atoms either may or may not be present in the aryl group;
  (c) an arylalkyl group, including substituted and unsubstituted arylalkyl groups, and wherein hetero atoms either may or may not be present in either or both of the alkyl portion and the aryl portion of the arylalkyl group; or
  (d) an alkylaryl group, including substituted and unsubstituted alkylaryl groups, and wherein hetero atoms either may or may not be present in either or both of the alkyl portion and the aryl portion of the alkylaryl group.

8. A colorant according to claim 7 wherein

—CH$_2$—R— is (a) —CH$_2$—CH(—(CH$_2$)$_m$—CH$_3$)— wherein m is an integer representing the number of repeat —CH$_2$— units;

(b) —CH$_2$—CH(—C$_6$H$_5$)—;

(c) —CH$_2$—CH$_2$—;

(d) —CH$_2$—CH(CH$_3$)—;

(e) —CH$_2$—CH=CH—CH$_2$—;

(f) —CH$_2$—CH(—O—CH$_3$)—;

(g) —CH$_2$—C(CH$_3$)$_2$—;

(h) —CH$_2$—CH(COOH)—;

(i) —CH$_2$—C(CH$_3$)(COOH)—;

or (j) mixtures thereof.

9. A colorant according to claim 1 wherein the polymer is a maleic anhydride copolymer.

10. A colorant according to claim 1 wherein the metal is Ca, Mg, Al, Sr, Ba Zn, or mixtures thereof.

11. A colorant according to claim 1 having a particle size of from about 0.05 to about 1 μm.

12. A phase change ink comprising:
  (a) a phase change ink carrier and
  (b) a colorant comprising a colored laked complex of:
    (1) a chromogen molecule having at least one:
      (i) carboxylic acid group,
      (ii) carboxylate group,
      (iii) sulfonic acid group,
      (iv) sulfonate group, or
      (v) combination thereof, and
    (2) a polymer selected from a maleic anhydride copolymer or oligomer and/or a carboxylic acid-containing oligomer, polymer, and/or copolymer,
    said chromogen molecule and said polymer each being complexed to
    (3) a metal.

13. An ink according to claim 12 wherein the phase change ink carrier comprises a monoamide, a branched triamide, a tetra-amide, or a mixture thereof.

14. An ink according to claim 12 wherein the phase change ink carrier comprises (a) a polyethylene wax, (b) a stearyl stearamide wax, (c) a dimer acid based tetra-amide that is the reaction product of dimer acid, ethylene diamine, and a carboxylic acid having at least about 36 carbon atoms, (d) a urethane resin derived from the reaction of two equivalents of hydroabietyl alcohol and one equivalent of isophorone diisocyanate, (e) a urethane resin that is the adduct of three equivalents of stearyl isocyanate and a glycerol-based alcohol.

15. An ink according to claim 12 wherein the phase change ink carrier comprises (a) a polyethylene wax, (b) a stearyl stearamide wax, (c) a branched triamide of the formula $$CH_3CH_2-C\begin{pmatrix} CH_2-(O-CH_2-CH(CH_3))_x-NH-C(O)-(CH_2)_pCH_3 \\ (O-CH_2-CH(CH_3))_y-NH-C(O)-(CH_2)_qCH_3 \\ CH_2-(O-CH_2-CH(CH_3))_z-NH-C(O)-(CH_2)_rCH_3 \end{pmatrix}$$

wherein x, y, and z each independently represent the number of propyleneoxy repeat units and x+y+z is from about 5 to about 6, and wherein p, q, and r each, independently of the others, are integers representing the number of repeat —(CH$_2$)— units, wherein p, q, and r have an average value of from about 35, (d) a urethane resin that is the adduct of three equivalents of stearyl isocyanate and a glycerol-based alcohol, and (e) a triglyceride of hydrogenated abietic acid.

16. An ink according to claim 12 wherein the colorant is present in the ink in an amount of from about 0.05 to about 50 percent by weight of the ink.

17. An ink according to claim 12 wherein chromogen molecule is

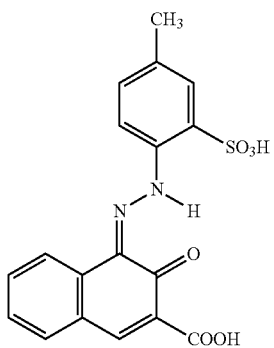 [SMILES: Cc1ccc(N/N=C2\C(=O)C(C(=O)O)=Cc3ccccc32)c(S(=O)(=O)O)c1]

or metal salts thereof,

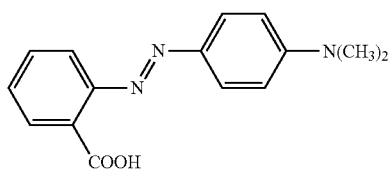 [SMILES: CN(C)c1ccc(/N=N/c2ccccc2C(=O)O)cc1]

or metal salts thereof,

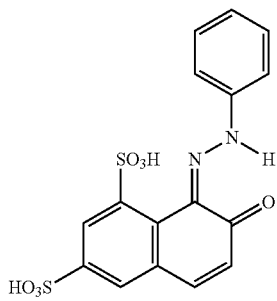 [SMILES: O=C1C=Cc2cc(S(=O)(=O)O)cc(S(=O)(=O)O)c2/C1=N/Nc1ccccc1]

or metal salts thereof,

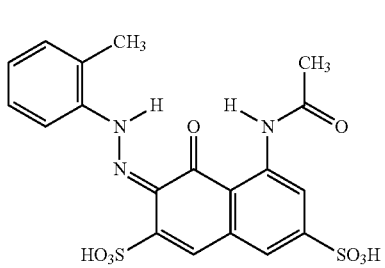

or metal salts thereof,

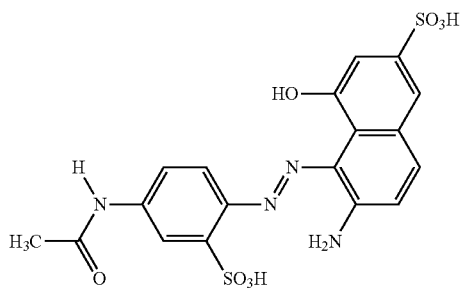 [SMILES: CC(=O)Nc1ccc(/N=N/c2c(N)ccc3cc(S(=O)(=O)O)cc(O)c23)c(S(=O)(=O)O)c1]

or metal salts thereof,

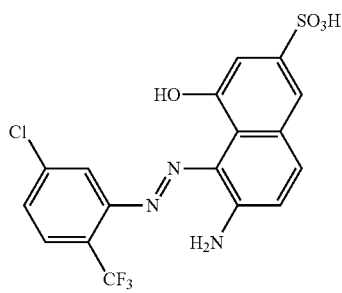 [SMILES: Nc1ccc2cc(S(=O)(=O)O)cc(O)c2c1/N=N/c1cc(Cl)ccc1C(F)(F)F]

or metal salts thereof,

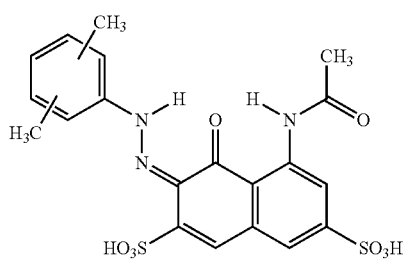

or metal salts thereof,

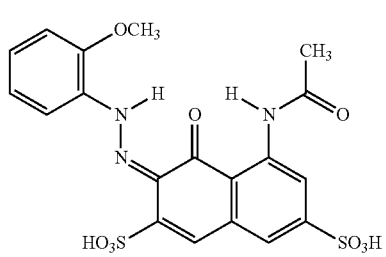

or metal salts thereof,

61
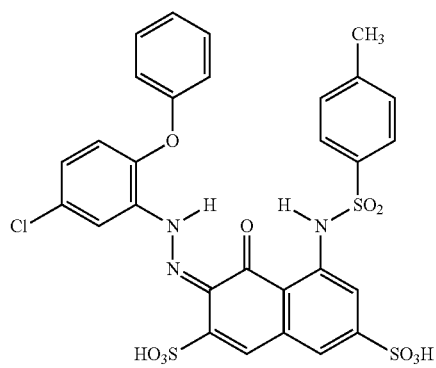 [SMILES: Cc1ccc(S(=O)(=O)Nc2cc(S(=O)(=O)O)cc3c2C(=O)/C(=N\Nc2cc(Cl)ccc2Oc2ccccc2)C(S(=O)(=O)O)=C3)cc1]
or metal salts thereof,
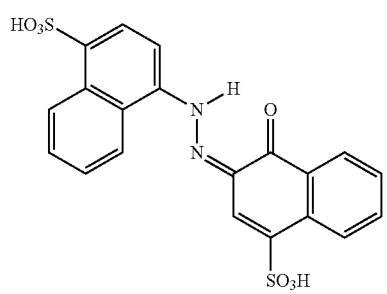 [SMILES: O=C1/C(=N\Nc2ccc(S(=O)(=O)O)c3ccccc23)C=C(S(=O)(=O)O)c2ccccc21]
or metal salts thereof,
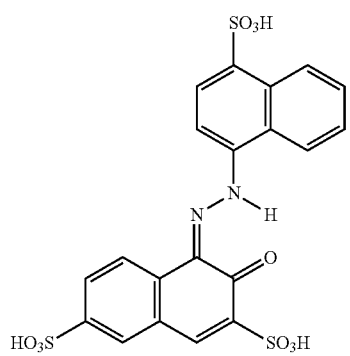 [SMILES: O=C1C(S(=O)(=O)O)=Cc2cc(S(=O)(=O)O)ccc2/C1=N/Nc1ccc(S(=O)(=O)O)c2ccccc12]
or metal salts thereof,
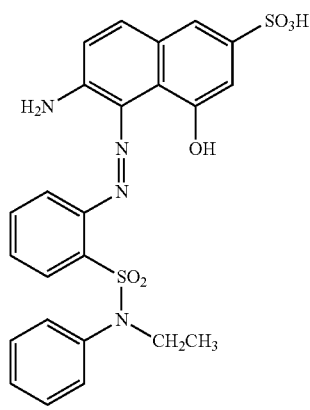 [SMILES: CCN(c1ccccc1)S(=O)(=O)c1ccccc1N=Nc1c(N)ccc2cc(S(=O)(=O)O)cc(O)c12]
or metal salts thereof,
62
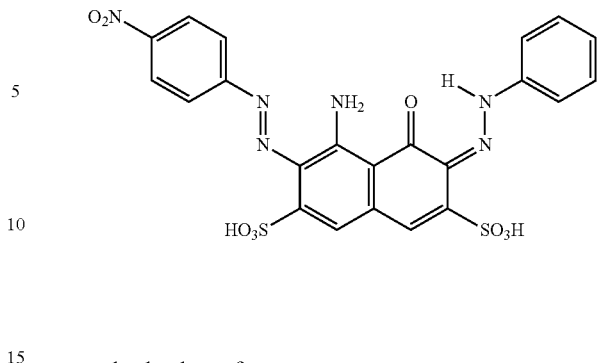
or metal salts thereof,
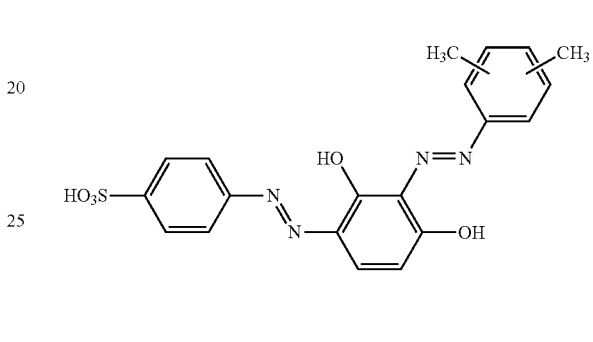
or metal salts thereof,
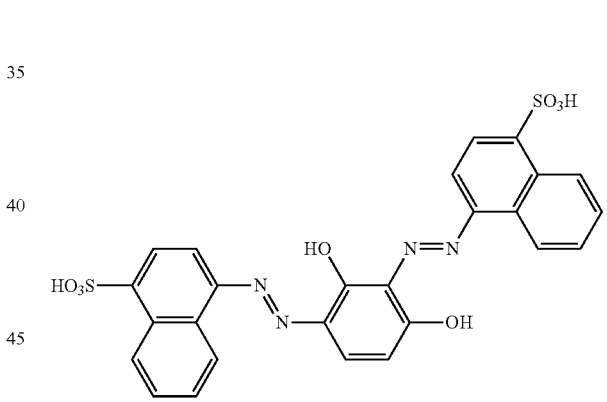
or metal salts thereof,
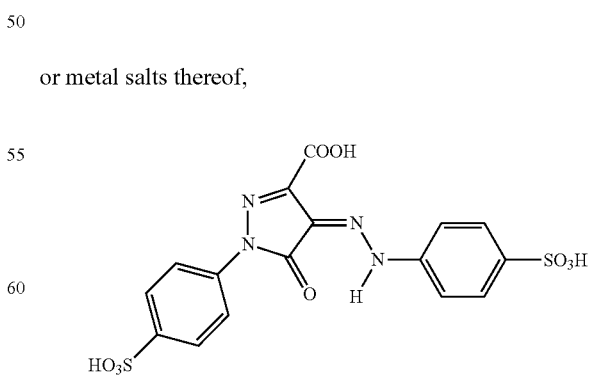
or metal salts thereof,

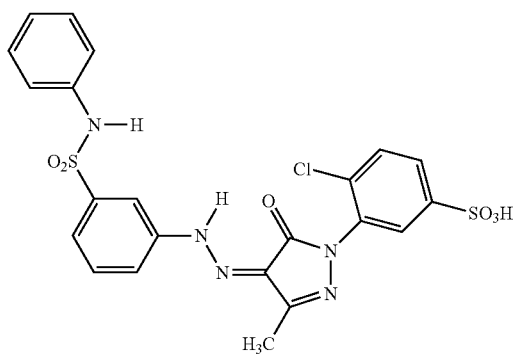 [SMILES: CC1=NN(c2cc(S(=O)(=O)O)ccc2Cl)C(=O)/C1=N\Nc1cccc(S(=O)(=O)Nc2ccccc2)c1]
or metal salts thereof,
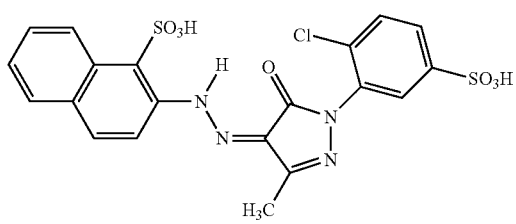 [SMILES: CC1=NN(c2cc(S(=O)(=O)O)ccc2Cl)C(=O)/C1=N\Nc1ccc2ccccc2c1S(=O)(=O)O]
or metal salts thereof,
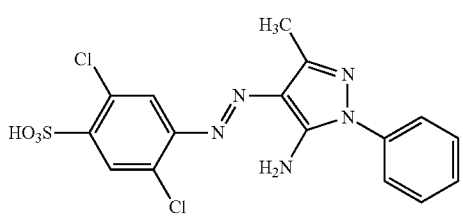 [SMILES: Cc1nn(-c2ccccc2)c(N)c1/N=N/c1cc(Cl)c(S(=O)(=O)O)cc1Cl]
or metal salts thereof,
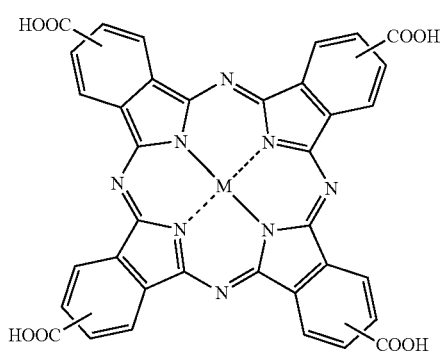
wherein M is $Cu^{2+}$, $Zn^{2+}$, or mixtures thereof, or metal salts thereof,
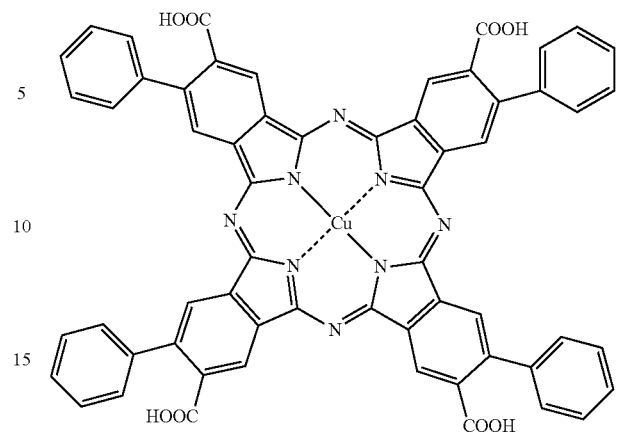
or metal salts thereof,
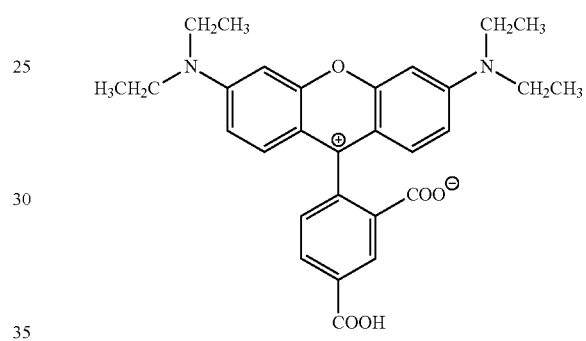
or metal salts thereof,
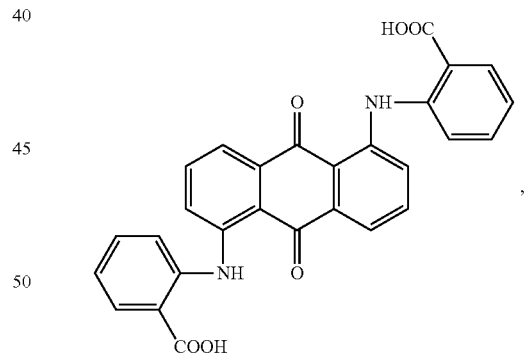
or metal salts thereof, or a mixture thereof.
18. An ink according to claim 12 wherein polymer is of the formula
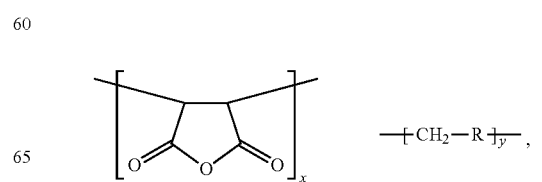

-continued

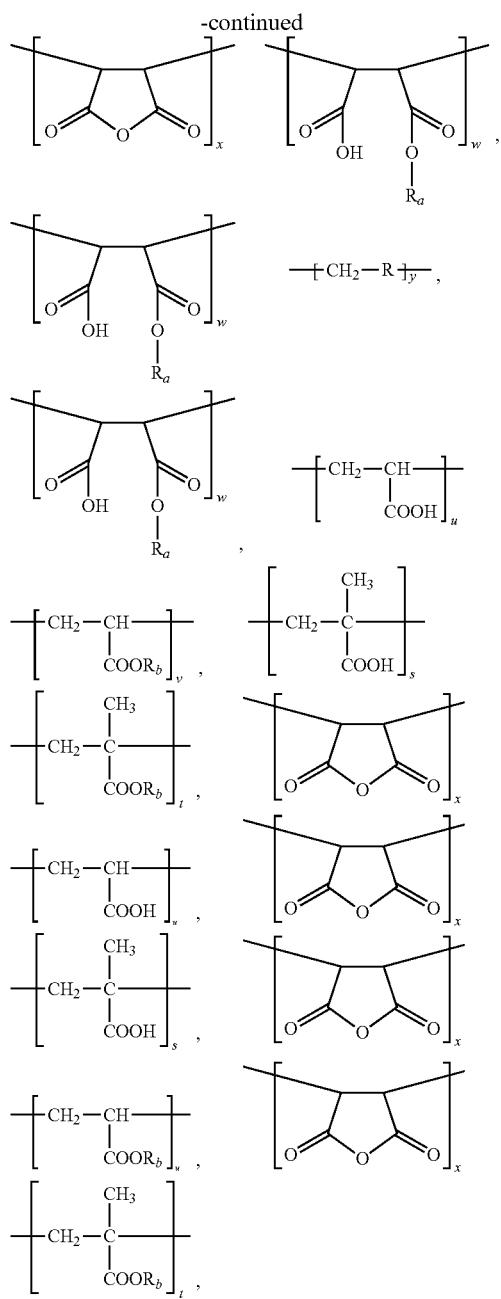

or mixtures thereof; wherein:
s is an integer representing the number of repeat methacrylic acid units;
t is an integer representing the number of repeat methacrylic ester units;
u is an integer representing the number of repeat acrylic acid units;
v is an integer representing the number of repeat acrylic ester units;
w is an integer representing the number of repeat maleic half ester units;
x is an integer representing the number of repeat maleic anhydride units;
y is an integer representing the number of repeat —$CH_2$— R— units;

R is:
(a) an alkyl group, including substituted and unsubstituted alkyl groups, and wherein hetero atoms either may or may not be present in the alkyl group;
(b) an aryl group, including substituted and unsubstituted aryl groups, and wherein hetero atoms either may or may not be present in the aryl group;
(c) an arylalkyl group, including substituted and unsubstituted arylalkyl groups, and wherein hetero atoms either may or may not be present in either or both of the alkyl portion and the aryl portion of the arylalkyl group; or
(d) an alkylaryl group, including substituted and unsubstituted alkylaryl groups, and wherein hetero atoms either may or may not be present in either or both of the alkyl portion and the aryl portion of the alkylaryl group;

$R_a$ is:
(a) an alkyl group, including substituted and unsubstituted alkyl groups, and wherein hetero atoms either may or may not be present in the alkyl group;
(b) an aryl group, including substituted and unsubstituted aryl groups, and wherein hetero atoms either may or may not be present in the aryl group;
(c) an arylalkyl group, including substituted and unsubstituted arylalkyl groups, and wherein hetero atoms either may or may not be present in either or both of the alkyl portion and the aryl portion of the arylalkyl group; or
(d) an alkylaryl group, including substituted and unsubstituted alkylaryl groups, and wherein hetero atoms either may or may not be present in either or both of the alkyl portion and the aryl portion of the alkylaryl group; and $R_b$ is:
(a) an alkyl group, including substituted and unsubstituted alkyl groups, and wherein hetero atoms either may or may not be present in the alkyl group;
(b) an aryl group, including substituted and unsubstituted aryl groups, and wherein hetero atoms either may or may not be present in the aryl group;
(c) an arylalkyl group, including substituted and unsubstituted arylalkyl groups, and wherein hetero atoms either may or may not be present in either or both of the alkyl portion and the aryl portion of the arylalkyl group; or
(d) an alkylaryl group, including substituted and unsubstituted alkylaryl groups, and wherein hetero atoms either may or may not be present in either or both of the alkyl portion and the aryl portion of the alkylaryl group.

19. An ink according to claim 12 wherein the metal is Ca, Mg, Al, Sr, Ba Zn, or mixtures thereof.

20. A phase change ink comprising:
(a) a phase change ink carrier comprising a monoamide, a branched triamide, a tetra-amide, or a mixture thereof; and
(b) a colorant comprising a colored laked complex of:
(1) a chromogen molecule having at least one:
(i) carboxylic acid group,
(ii) carboxylate group,
(iii) sulfonic acid group,
(iv) sulfonate group, or
(v) combination thereof, and (2) a maleic anhydride copolymer of the formula

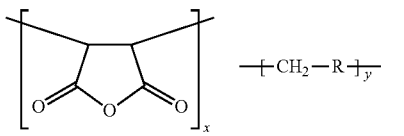

wherein x is an integer representing the number of repeat maleic anhydride units, y is an integer representing the number of repeat —CH$_2$—R— units, and R is:
(i) an alkyl group, including substituted and unsubstituted alkyl groups, and wherein hetero atoms either may or may not be present in the alkyl group;
(ii) an aryl group, including substituted and unsubstituted aryl groups, and wherein hetero atoms either may or may not be present in the aryl group;
(iii) an arylalkyl group, including substituted and unsubstituted arylalkyl groups, and wherein hetero atoms either may or may not be present in either or both of the alkyl portion and the aryl portion of the arylalkyl group; or
(iv) an alkylaryl group, including substituted and unsubstituted alkylaryl groups, and wherein hetero atoms either may or may not be present in either or both of the alkyl portion and the aryl portion of the alkylaryl group;
said chromogen molecule and said maleic anhydride copolymer each being complexed to
(3) a metal which is Ca, Mg, Al, Sr, Ba Zn, or a combination thereof;
said colorant being present in the ink in an amount of from about 0.1 to about 10 percent by weight.

* * * * *